(12) United States Patent
Kawanobe et al.

(10) Patent No.: US 8,746,940 B2
(45) Date of Patent: Jun. 10, 2014

(54) VEHICLE HEADLIGHT

(71) Applicant: Stanley Electric Co., Ltd., Tokyo (JP)

(72) Inventors: Shoko Kawanobe, Tokyo (JP); Yasushi Kita, Tokyo (JP); Takashi Sato, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 21 days.

(21) Appl. No.: 13/673,984

(22) Filed: Nov. 9, 2012

(65) Prior Publication Data

US 2013/0114283 A1    May 9, 2013

(30) Foreign Application Priority Data

Nov. 9, 2011  (JP) ................................ 2011-245848

(51) Int. Cl.
*B60Q 3/04* (2006.01)
(52) U.S. Cl.
USPC .......................................... 362/538; 362/543

(58) Field of Classification Search
CPC .................................................. F21Y 2101/02
USPC .................................................. 362/538, 543
See application file for complete search history.

(56) References Cited

U.S. PATENT DOCUMENTS

| 2007/0047250 | A1 | 3/2007 | Kinoshita |
| 2011/0199776 | A1* | 8/2011 | Takahashi et al. ............ 362/538 |
| 2012/0230046 | A1* | 9/2012 | Rice et al. ..................... 362/538 |

FOREIGN PATENT DOCUMENTS

| JP | 2007-59162 A | 3/2007 |
| JP | 2008-204727 A | 9/2008 |

* cited by examiner

*Primary Examiner* — Evan Dzierzynski
(74) *Attorney, Agent, or Firm* — Kenealy Vaidya LLP

(57) ABSTRACT

Light emitted from a light source having an S/P ratio being 2.0 or more is projected to a peripheral area in front of a vehicle body, and thereby an earlier awareness with the peripheral vision under dark environment (e.g., during nighttime driving) can be facilitated.

20 Claims, 24 Drawing Sheets

Fig. 4

| | Peripheral Vision (40° Angle of View) | Central Vision (Angle of View ~5 to 10°) |
|---|---|---|
| Visual Cell Distribution | Rod Cell Around retina | Cone Cell At the center of retina |
| Function | Only capable of discriminating brightness | Capable of discriminating color |
| Role | Obtain spatial information (motion, speed, direction, etc.) WHERE | Identify and recognize an object (obstacle, preceding vehicle, etc.) WHAT |
| Category of Discrimination | Mesopic Vision, Scotopic Vision | Photopic Vision |

Japanese Evaluation Results

Americans Evaluation Results

Area from which driver feels the sense of brightness.

Illuminance in the area from which driver feels the sense of brightness.

VEHICLE HEADLIGHT

This application claims the priority benefit under 35 U.S.C. §119 of Japanese Patent Application No. 2011-245848 filed on Nov. 9, 2011, which is hereby incorporated in its entirety by reference.

TECHNICAL FIELD

The presently disclosed subject matter relates to vehicle headlights, and in particular, to a vehicle headlight that is capable of facilitating earlier awareness with peripheral vision under dark environments (e.g., during nighttime driving).

BACKGROUND ART

In the technical field of conventional vehicle headlights, there is a certain demand for providing a vehicle headlight to project light with higher luminance in order to allow for operation of the vehicle during nighttime driving just like during daytime driving. In response to such a demand, there have been proposed various headlights, such as, those employing a high luminous flux light source including halogen lamps, HID lamps, and the like, those with improved optical systems, and the like in order to improve the luminance (brightness, luminous flux, light emission efficiency and the like). Such a vehicle headlight is disclosed in Japanese Patent Application Laid-Open No. 2007-59162 or U.S. Patent Application No. 2007/047250A1 corresponding thereto, for example.

In general, human eyes have characteristics such that the sensitivity of eyes under dark environment (e.g., during nighttime driving) increases more to the red light than to the blue light. In consideration of these characteristics, Japanese Patent Application Laid-Open No. 2008-204727 proposes a vehicle headlight for that purpose. As shown in FIGS. 1A and 1B, this vehicle headlight can illuminate the front area A1 with light having a larger amount of the blue light component than the red light component in order to enhance the visibility during nighttime driving and also can illuminate the central area A2 in the front area A1 with light having a larger amount of the red light component than the other light components in order to enhance the recognition by a driver with respect to color, shape, or other features of the road or an object on the road (as well as the area A3 above the horizontal line in the distribution diagram).

However, it has not been conventionally known how the blue light affects the awareness with the peripheral vision under dark environment (e.g., during nighttime driving).

FIG. 2A is an explanatory diagram illustrating the central vision and the peripheral vision of a driver, and FIG. 2B is an explanatory diagram illustrating the relationship between the central vision, the peripheral vision, the cone cell, and the rod cell of a driver. Furthermore, FIG. 3 is a flow chart describing the flow of how a driver can recognize an object (such as a pedestrian and an obstacle) existing in the peripheral visual field.

Now examine how the driver who keeps close watch on a farther area (see, for example, three circles in FIG. 2A and the center arrowed portion in FIG. 2B) can recognize an object (such as a pedestrian and an obstacle) existing in the peripheral visual field. In this case, as shown in FIG. 3, the driver first becomes aware of the object by his/her peripheral vision (with the use of rod cells). (Step S1: Yes) Then, the driver directs his/her eyes to the direction where the object is located (step S2). After that, the driver can recognize the object such as the color and shape thereof by his/her central vision (with the use of cone cells). (Step S3) If the driver does not become aware of the object by his/her peripheral vision (with the use of rod cells), this means that the driver has missed the object (step S4). Namely, it is important for a driver to first become aware of an object that exists in the peripheral visual field. If the driver does not become aware of the object as it exists in the peripheral visual field, he/she ma never recognize the object.

In particular, under dark environment (e.g., during nighttime driving), there are many situations in which the awareness with the peripheral vision (equal to the use of rod cells, meaning the scotopic sensitivity) is required or helpful, such as during right or left turns at an intersection, bifurcation, changing lanes, and keeping aligned in a lane. Therefore, it is important to cause a driver to become aware of such a situation earlier. For example, since the area closer to the front side of the vehicle body when viewed from a driver side is not sufficiently illuminated with light from a vehicle headlight, it is difficult for a driver to become aware of an object existing in the peripheral visual field. In addition, the wider the road width is, the more difficult it is for a driver to become aware of an object closer to the vehicle front side.

In general, cone cells and rod cells are distributed over the retina of human eyes. FIG. 4 is a table listing the comparisons between the peripheral vision and the central vision. As shown in the table of FIG. 4, the cone cells and the rod cells are very different from each other in terms of the distributed area, the number thereof, the function, the role, the active environment, and the like. The rod cells are cells for detecting an object on which a driver's eyes is to be turned, and are distributed around the field of view (peripheral vision). The rod cells can work under dark environment (scotopic vision). On the other hand, the cone cells are cells for identifying and recognizing an object while obtaining and determining detailed information, and are distributed over the central area of the field of view (central vision). The cone cells can work under the bright environment (photopic vision). Specifically, human eyes can sense light from a bright area to a dark area by the complementary effect of both the photoreceptor cells (rod and cone cells).

Unlike daytime driving, nighttime driving is performed under dark environment (meaning that the photopic vision is not mainly utilized). Since the road is illuminated with a headlight to a certain degree, it is not a completely dark environment (meaning that the scotopic vision may not be mainly utilized). Namely, the environment during nighttime driving is a dim environment with the use of mesopic vision between the photopic vision and the scotopic vision (meaning that both the cone and rod cells are activated). In this case, the adaptation illuminance is approximately 1 lx.

FIG. 5 is an explanatory graph showing the relative luminosity factor $V(\lambda)$ in the photopic vision and the relative luminosity factor $V'(\lambda)$ in the scotopic vision. As shown, the peak of the luminosity curve is shifted to the short wavelength side while the photopic vision is shifted via the mesopic vision to the scotopic vision. This peak shift is derived from the difference between the spectral sensitivities of the cone cells and the rod cells.

The present inventors have conducted intensive studies on the visual features of human eyes, and considered that the enhanced energy components with shorter wavelengths (bluish light component) could effectively stimulate the rod cells under dark environment (e.g., during nighttime driving), thereby facilitating awareness with the peripheral vision.

Based on this assumption, the inventors have performed various experiments and conducted studies based thereon, and found that the increased amount of energy components with shorter wavelengths (bluish light component) can facilitate an earlier awareness with the peripheral vision under dark environment (e.g., during nighttime driving) (with shorter reaction speed while lowering the missing-out rate), thereby resulting in the presently disclosed subject matter.

SUMMARY

The presently disclosed subject matter was devised in view of these and other problems and features in association with the conventional art. According to an aspect of the presently disclosed subject matter, a vehicle headlight can facilitate an earlier awareness with the peripheral vision under dark environment during nighttime (or low level light) driving.

According to another aspect of the presently disclosed subject matter, a vehicle headlight can include a light source and an optical system configured to direct light emitted from the light source to at least a peripheral area of an illumination area in front of a vehicle body, wherein an S/P ratio of the light source is represented by $(S(\lambda)*V'(\lambda))/(S(\lambda)*V(\lambda))$ in which $S(\lambda)$ is a spectrum of the light source, $V'(\lambda)$ is a relative luminosity factor in scotopic vision, and $V(\lambda)$ is a relative luminosity factor in photopic vision, and wherein the S/P ratio is 2.0 or more.

With this configuration, since the light emitted from the light source having the S/P ratio being 2.0 or more is projected to the peripheral area in front of the vehicle body, an earlier awareness with peripheral vision under dark environment (e.g., during nighttime driving) can be facilitated.

According to another aspect of the presently disclosed subject matter, a vehicle headlight can be configured to form a prescribed light distribution pattern on a virtual vertical screen in front of a vehicle body, with the light distribution pattern including a central area of an illumination area including an intersection between a horizontal center line and a vertical center line on the virtual vertical screen and peripheral areas located on either side of the central area, and to include a first light source, a second light source, a first optical system configured to direct light emitted from the first light source to the central area of the light distribution pattern, and a second optical system configured to direct light emitted from the second light source to the peripheral areas, wherein the first light source has an S/P ratio, which is represented by $(S(\lambda)*V'(\lambda))/(S(\lambda)*V(\lambda))$ in which $S(\lambda)$ is a spectrum of the first light source, $V'(\lambda)$ is a relative luminosity factor in scotopic vision, and $V(\lambda)$ is a relative luminosity factor in photopic vision, lower than that of the second light source.

If the first light source emits light while having the same S/P ratio as that of the second light source, glare light may be projected to an opposite vehicle.

With this configuration, the first light source having the S/P ratio lower than that of the second light source can emit light toward the central area of the illumination area. Therefore, when compared with the case where the light source having the same S/P ratio as that of the second light source illuminates the central area with light, occurrence of the glare light to an opposite vehicle can be suppressed or prevented.

Further, with this configuration, the second light source having the higher S/P ratio than that of the first light source can emit light toward the peripheral area of the illumination area. Therefore, when compared with the case where the light emitted from a light source having the same S/P ratio as that of the first light source is projected to the peripheral area, the earlier awareness with the peripheral vision under dark environment (e.g., during nighttime driving) can be facilitated.

As described above, the second aspect can suppress the provision of glare light to an opposite vehicle as well as the earlier awareness with the peripheral vision under dark environment (e.g., during nighttime driving) can be facilitated.

In the vehicle headlight with the above configuration, the S/P ratio of the second light source can be set to 2.0 or more.

Since the light emitted from the second light source with the S/P ratio of 2.0 or more can be projected toward the peripheral area, the earlier awareness with the peripheral vision under dark environment (e.g., during nighttime driving) can be facilitated.

In the vehicle headlight with the above configuration, the S/P ratio of the first light source can be set to 1.5 or more.

With this configuration, the first light source having the lower S/P ratio (being, for example, 1.5 or more) than that of the second light source (being, for example, 2.0 or more) can emit light toward the central area of the illumination area. Therefore, when compared with the case where the light emitted from a light source having the same S/P ratio (being, for example, 2.0 or more) as that of the second light source is projected to the central area, occurrence of glare light to an opposite vehicle can be suppressed or prevented.

The vehicle headlight with the above configuration may further include a third light source and a third optical system therefor. The prescribed light distribution pattern may further include an intermediate area between the central and peripheral areas on the virtual vertical screen, through which signs relatively move and pass during traveling. Then, the third optical system can project light emitted from the third light source to the intermediate area of the illumination area.

In the vehicle headlight with the above configuration, the intermediate area through which signs relatively move and pass during traveling can be illuminated with light emitted from the third light source having a different S/P ratio from those of the first and second light sources.

In the vehicle headlight with the above configuration, the third light source can have an S/P ratio of 1.8 or more.

When the light emitted from the third light source with the S/P ratio of 1.8 or more can be projected to the intermediate area where signs relatively move and pass during driving, a driver can observe the signs (including, particularly, white, blue and green colored signs) clearly even under dark environment (e.g., during nighttime driving).

In the vehicle headlight with the above configuration, the prescribed light distribution pattern may further include a near side area disposed below the horizontal center line on the virtual vertical screen, and the second optical system can project the light emitted from the second light source to the near side area in addition to the peripheral areas.

Accordingly, when the light emitted from the second light source (for example, being a light source having the S/P ratio of 2.0 or more) can be projected to the near side area of the illumination area disposed below the horizontal center line on the virtual vertical screen, the sense of brightness at the near side area in front of the vehicle body can be enhanced without substantial increase in the brightness (illuminance).

As described above, it is possible to provide a vehicle headlight by which earlier awareness with the peripheral vision under dark environment (e.g., during nighttime driving) can be facilitated.

BRIEF DESCRIPTION OF DRAWINGS

These and other characteristics, features, and advantages of the presently disclosed subject matter will become clear from the following description with reference to the accompanying drawings, wherein:

FIG. 4 is a table listing comparisons between the peripheral vision and the central vision;

DESCRIPTION OF EXEMPLARY EMBODIMENTS

Figure 1A:
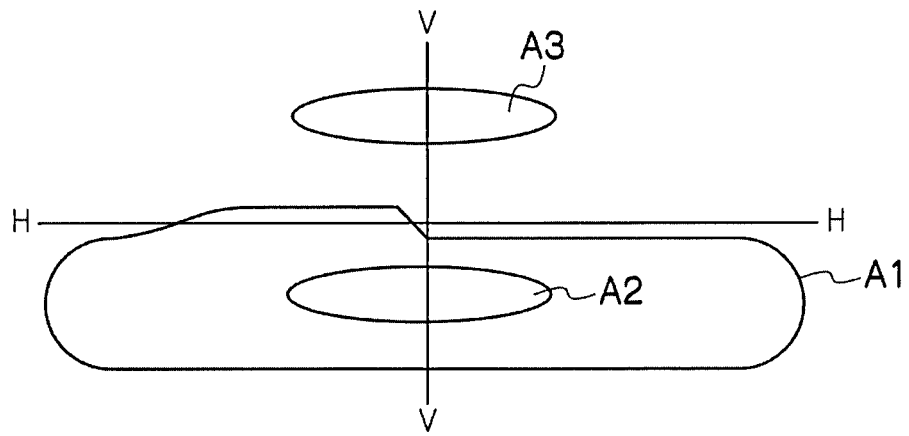
FIGS. 1A and 1B are a light distribution pattern formed by a conventional vehicle headlight on a virtual vertical screen, and the light distribution pattern of the same projected on a road surface, respectively.
Figure 1B:
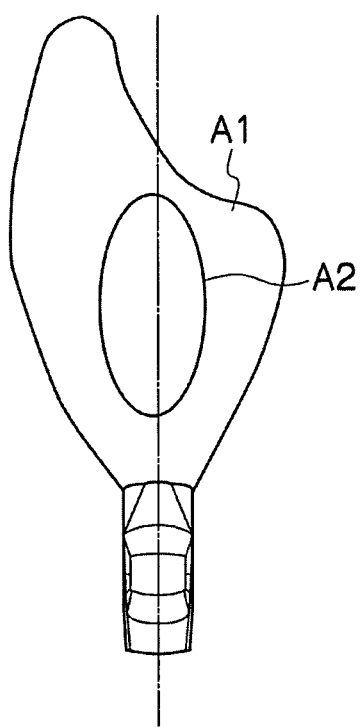

A description will now be made below to vehicle headlights of the presently disclosed subject matter with reference to the accompanying drawings in accordance with exemplary embodiments.

Further, note that the directions of up, down (low), right, left, front, and rear (back), and the like are defined on the basis of the actual posture of a lighting unit or a headlight installed on a vehicle body, unless otherwise specified.

The inventors have considered that the enhanced energy components with shorter wavelengths (bluish light component) could effectively stimulate the rod cells under dark environment (e.g., during nighttime driving), thereby facilitating awareness with the peripheral vision.

Then, the inventors have performed various experiments and conducted studies based thereon, and found that the increased amount of energy components with shorter wavelengths (bluish light component) can facilitate the earlier awareness with the peripheral vision under dark environment (e.g., during nighttime driving) (with shorter reaction speed while lowering the missing-out rate), thereby resulting in the presently disclosed subject matter.

First of all, a description will be given of Experiments 1 to 5 conducted by the present inventors.

In the following experiments, an S/P ratio was used as an index representing the ratio of the energy components with shorter wavelengths (bluish light component). Specifically, the S/P ratio of a light source can be represented by $$S/P\ ratio = (S(\lambda)*V'(\lambda))/(S(\lambda)*V(\lambda))$$

in which $S(\lambda)$ is a spectrum of the light source, $V'(\lambda)$ is a relative luminosity factor in scotopic vision, and $V(\lambda)$ is a relative luminosity factor in photopic vision.

The S/P ratio can be determined by measuring a spectrum of light emitted from a light source to be measured by means of a known measuring device such as a spectral radiance meter, and calculating the data using the above expression.

In the traditional technical field, a vehicle headlight has not utilized a light source with an S/P ratio of 2.0 or more and there has been no knowledge about the influence of light from a light source with the S/P ratio of 2.0 or more on the awareness with peripheral vision (equal to the use of rod cells, meaning the scotopic sensitivity) under a dark environment (e.g., during nighttime driving).

The following table 1 lists the S/P ratios of common light sources for a vehicle headlight measured by the present inventors. In general, the higher S/P ratio the light source has, the more the emitted light has the energy components with shorter wavelengths (bluish light component).

TABLE 1

| Light Source | S/P ratio |
| --- | --- |
| Halogen Bulb | 1.46 |
| HID Bulb | 1.75 |
| LED manufactured by O Company | 1.8 |
| LED manufactured by N Company | 1.5 |
| LED manufactured by S Company | 1.5 |

Each of the light sources listed in Table 1 is a light source for a vehicle headlight that is mounted in a commercially available automobile. As is clear from the results in Table 1, the S/P ratio of a common light source for use in a vehicle headlight is about 1.5 to 1.8.

Note, however, that the halogen bulb and HID bulb each have a higher S/P ratio of 1.46 or 1.75 due to difficulty in changing its S/P ratio caused by its specific structure.

Each of the LEDs in Table 1 is a white LED with a configuration combining a blue LED element with a yellow phosphor like YAG. The white LED with this configuration can satisfy the white area of emission light on the CIE chromaticity diagram as stipulated under the particular rule or law, and can be adjusted in yellow phosphor concentration in order for a driver or the like to observe color as natural as possible. Note that the white area on the CIE chromaticity diagram as stipulated under the particular rule or law is defined by the coordinate values of (0.31, 0.28), (0.44, 0.38), (0.50, 0.38), (0.50, 0.44), (0.455, 0.44), and (0.31, 0.35) (within the area surrounded by the lines connecting these coordinate values).

If the white LED with the above structure has the S/P ratio lower than 1.5, it is difficult to satisfy the light within the white area on the CIE chromaticity diagram as stipulated by particular rule or law. Therefore, the lower limit of the S/P ratio can be about 1.5. On the other hand, if the white LED with the above structure has the S/P ratio of about 2 (for example around 1.95), the light source can satisfy the white area of emission light on the CIE chromaticity diagram as stipulated by the particular law. When, however, the S/P ratio exceeds 1.8 and reaches 2, the yellowish light components will decrease and the light becomes bluish, which is not natural color for driver's eyes. Further, when the S/P ratio exceeds 1.8 and reaches 2, the light emission efficiency will decrease (the amount of luminous fluxes will decrease), resulting in insufficient illuminance required for a light source for a vehicle headlight. Therefore, in order to provide natural color of light for driver's eyes as well as to configure a vehicle headlight with high efficiency, the S/P ratio of a white LED with the above configuration should have an upper limit of about 1.8.

As described above, conventional vehicle headlights have adopted light sources with their S/P ratio of about 1.5 to 1.8, and have not adopted a light source with an S/P ratio of 2.0 or more. In the traditional technical field, there has not been significant knowledge about the influence of light from a light source with the S/P ratio of 2.0 or more on the awareness with peripheral vision (equal to the use of rod cells, meaning the scotopic sensitivity) under dark environment (e.g., during nighttime driving).

Experiment 1

The present inventors have conducted the following experiment in order to confirm the influence of light from light sources with various S/P ratios (in particular, 2.0 or more) on the awareness with respect to peripheral vision (equal to the use of rod cells, meaning the scotopic sensitivity) under dark environment (e.g., during nighttime driving).

Figure 6:
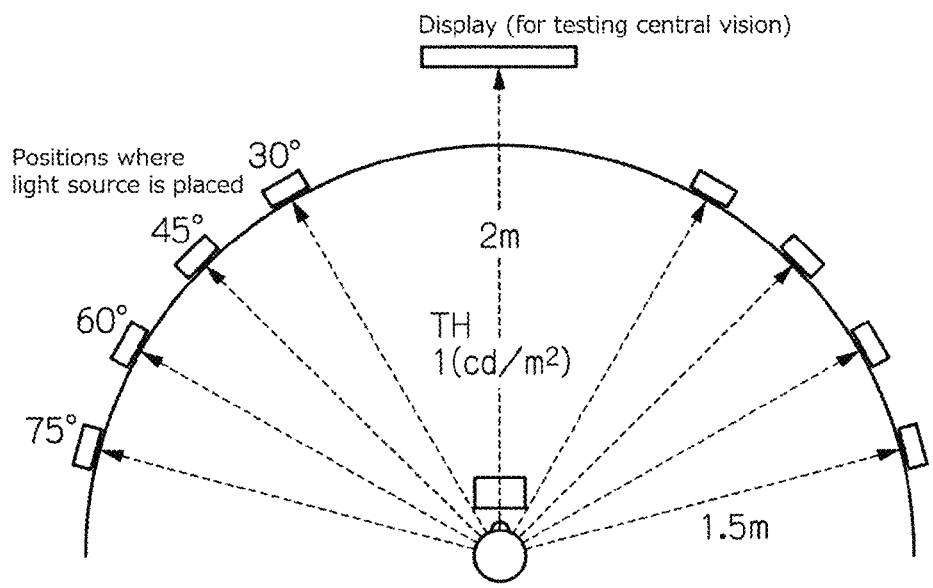
FIG. 6 is a diagram illustrating the configuration of an exemplary device used in Experiment 1.
Figure 7:
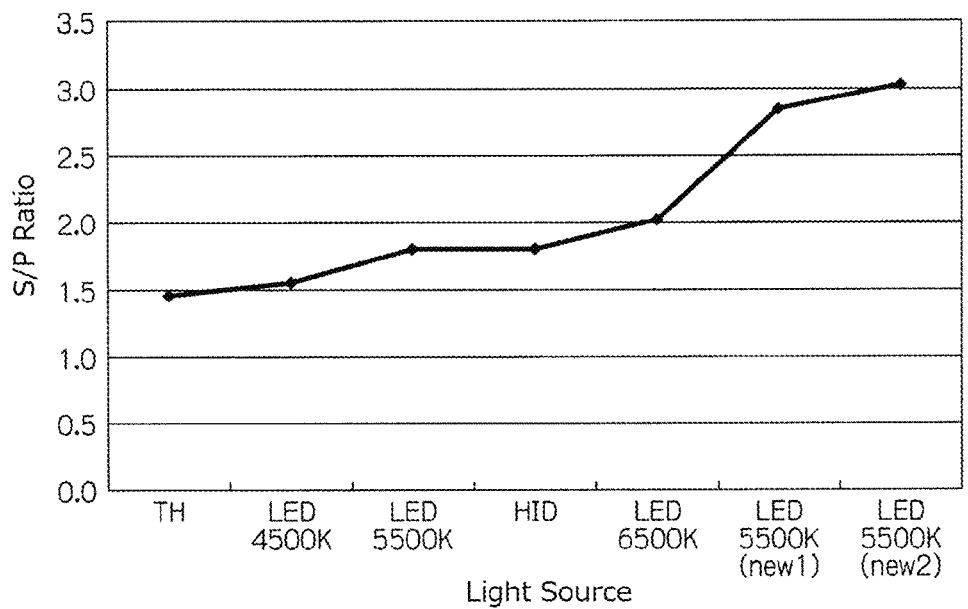
FIG. 7 is a graph showing S/P ratios of various light sources used in Experiment 1.

FIG. 6 is a diagram illustrating the configuration of an exemplary device used in Experiment 1, and FIG. 7 is a graph showing S/P ratios of various light sources used in Experiment 1.

Figure 2A:
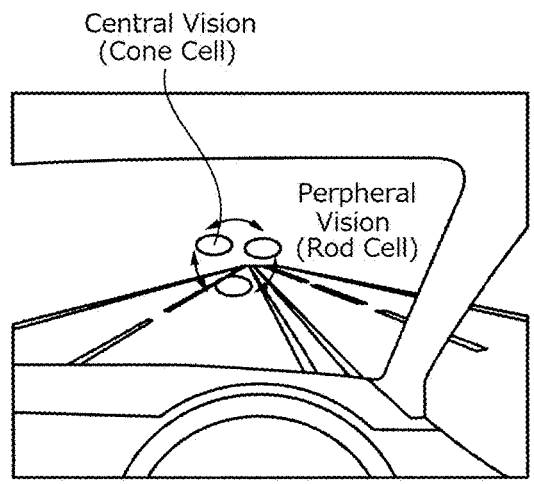
FIGS. 2A and 2B are an explanatory diagram illustrating the central vision and the peripheral vision of a driver, and an explanatory diagram illustrating the relationship between the central vision, the peripheral vision, the cone cell, and the rod cell of a driver, respectively (the illustrated spectra of respective light sources are those with the same luminance)
Figure 2B:
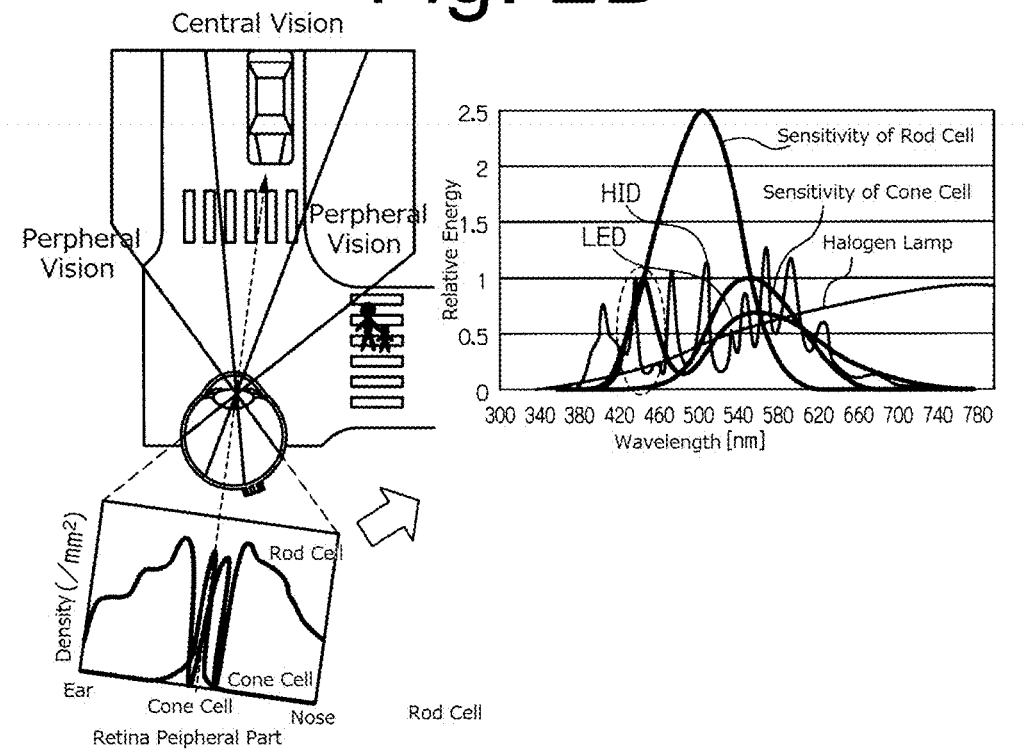
Figure 3:
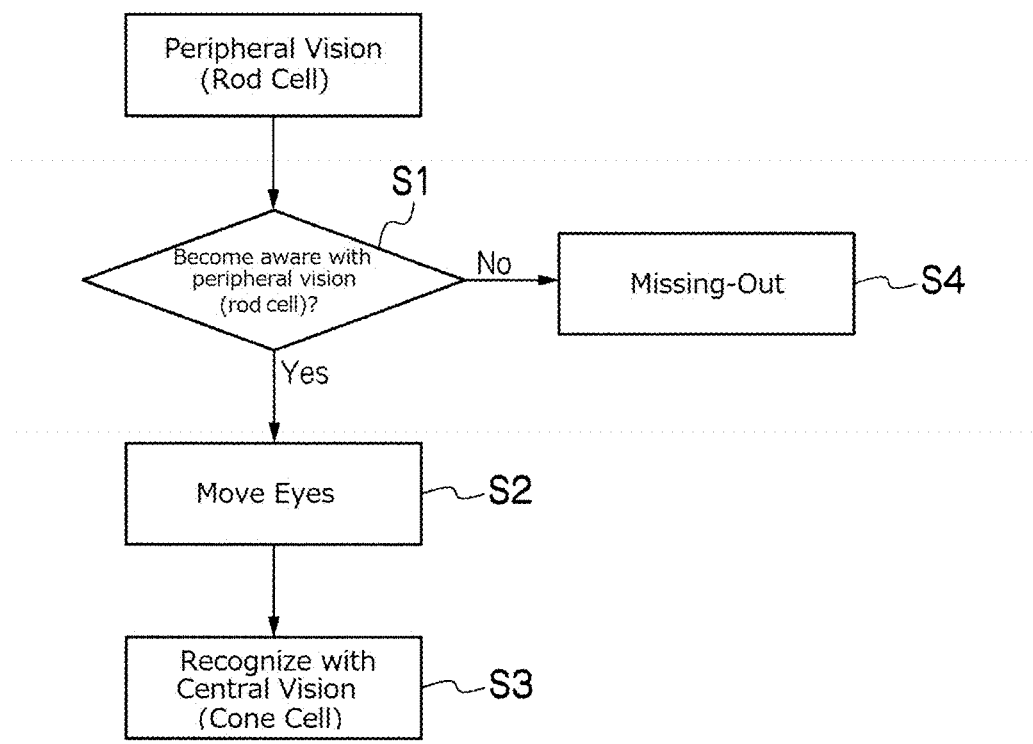
FIG. 3 is a flow chart describing the flow of how a driver can recognize an object (such as a pedestrian and an obstacle) existing in the peripheral visual field.
Figure 5:
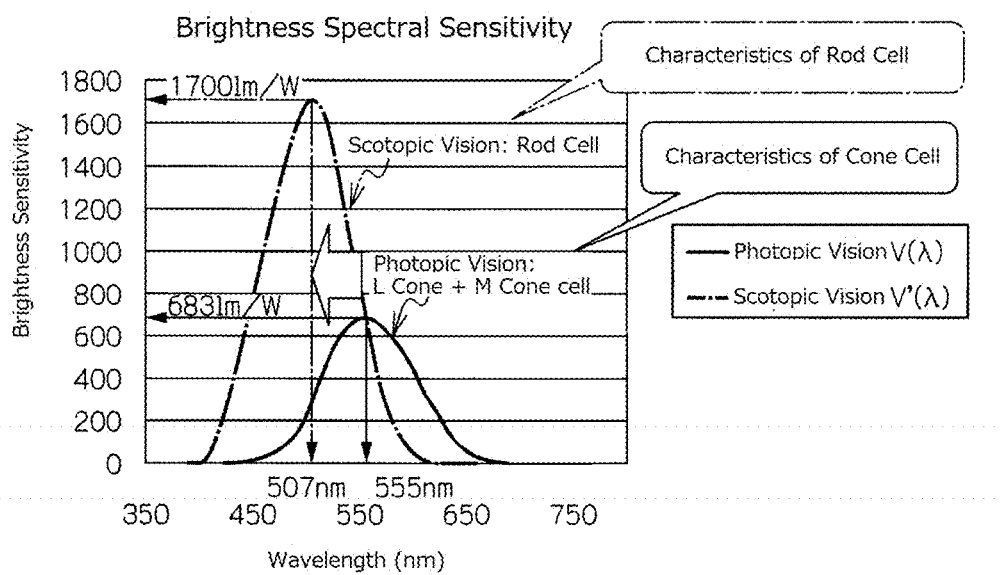
FIG. 5 is an explanatory graph showing the relative luminosity factor V(λ) in the photopic vision and the relative luminosity factor V'(λ) in the scotopic vision.

Experiment 1 was conducted with the device having the configuration shown in FIG. 6 and the seven light sources with different correlated color temperatures and S/P ratios shown in the following table 2 and FIG. 2.

TABLE 2

| Light Source | S/P ratio |
| --- | --- |
| TH | 1.46 |
| LED 4500K | 1.56 |
| LED 5500K | 1.81 |
| HID | 1.82 |
| LED 6500K | 2.03 |
| LED 5500K (new 1) | 2.85 |
| LED 5500K (new 2) | 3.03 |

Figure 8:
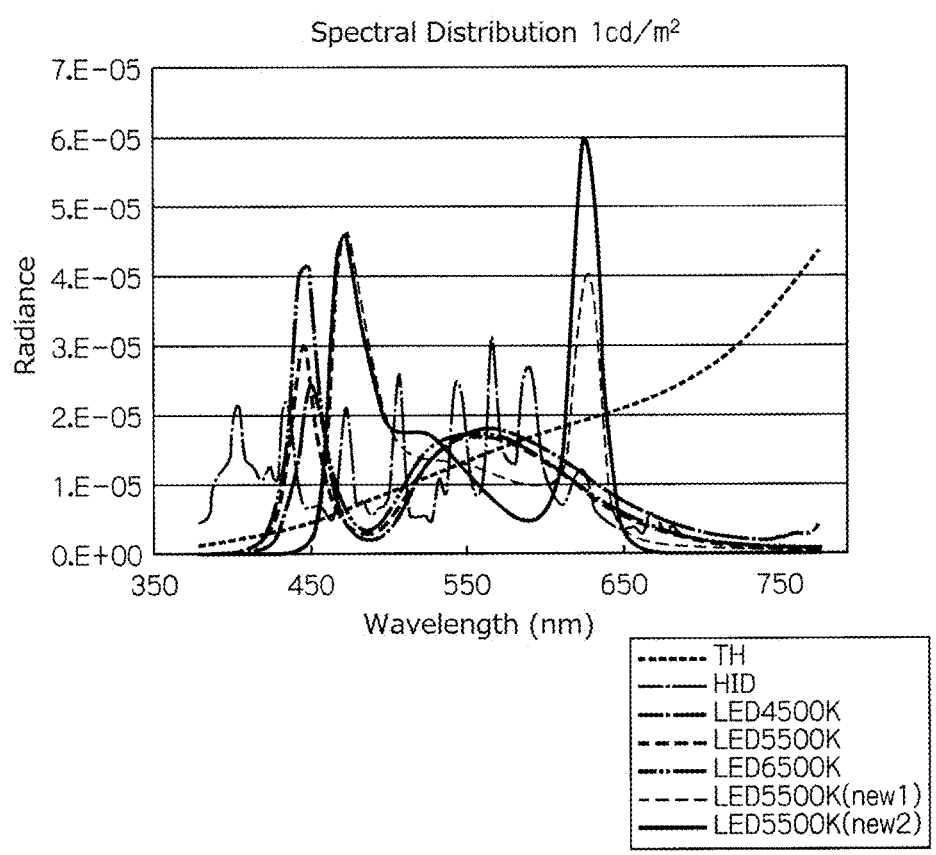
FIG. 8 is a graph showing spectral distributions of the respective various light sources used in Experiment 1.

FIG. 8 is a graph showing spectral distributions of the respective various light sources used in Experiment 1. Note that the "TH" means a halogen bulb and the "HID" means an HID bulb. The numeral attached to the LED indication represents each correlated color temperature.

Specifically, the light sources of LED 4500K, LED 5500K, and LED 6500K were white LEDs prepared by combining a blue LED element with a yellow phosphor and adjusting the concentration of the yellow phosphor to provide the particular correlated color temperature and the S/P ratio as shown in Table 2.

Figure 9A:
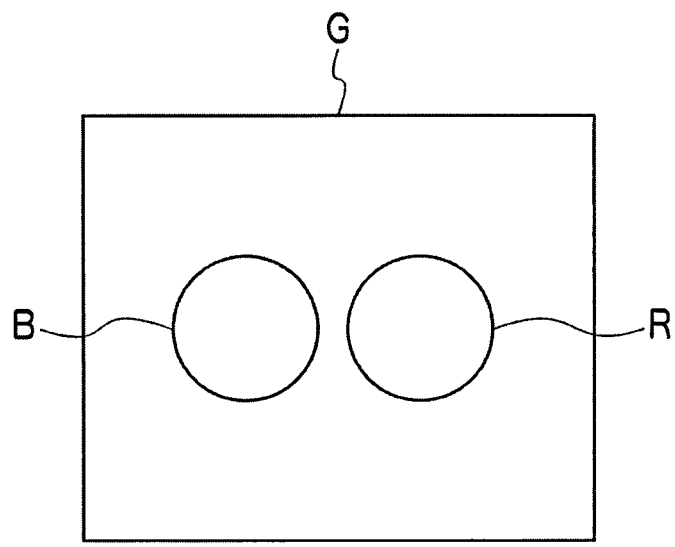
FIGS. 9A and 9B are diagrams each illustrating an exemplary light source configuration with a light source having the S/P ratio of 2.0 or more.

FIG. 9A is a diagram illustrating an exemplary light source configuration with the light source having the S/P ratio of 2.0 or more (LED 5500K (new 1) and LED 5500K (new 2)).

As shown in FIG. 9A, the LED 5500K (new 1) and the LED 5500K (new 2) each can be a white LED with a blue LED element B, a red LED element R, and a green phosphor G in combination wherein the concentration of the green phosphor G is adjusted to increase the green light component, thereby providing the S/P ratio as shown in Table 2. Note that the green phosphor G can cover the blue LED element B and the red LED element R and can be excited by blue light emitted from the blue LED element B to emit green light. When the green light component increases, the emission color becomes bluish green, meaning that the emission color is deviated from the white area on the CIE chromaticity diagram as stipulated by the particular law. In order to compensate this, the red LED element R can emit red light with regulated output, thereby adjusting the emission color within the white area on the CIE chromaticity diagram as stipulated by the particular law.

The LED 5500K (new 1) and the LED 5500K (new 2) were adjusted so as to provide respective spectral distributions of light source that are close to those which are expected to facilitate the earlier awareness with peripheral vision.

Figure 10:
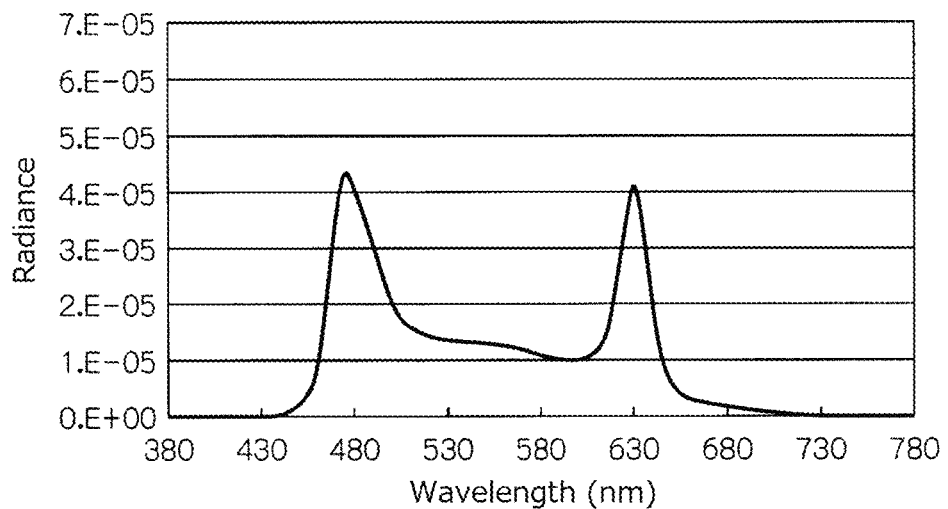
FIG. 10 is a graph showing a spectral distribution of an LED 5500K (new 1) used in Experiment 1.
Figure 11:
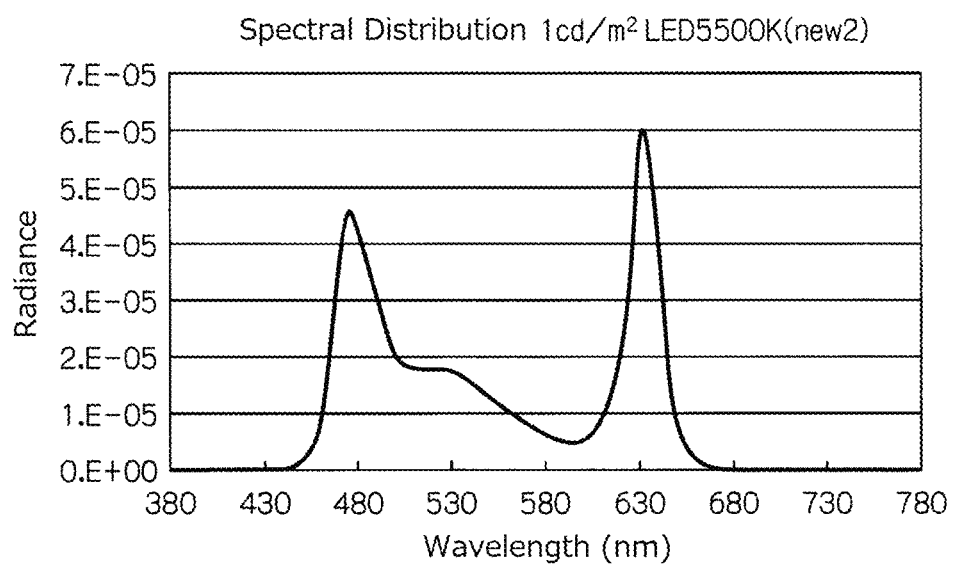
FIG. 11 is a graph showing a spectral distribution of an LED 5500K (new 2) used in Experiment 1.
Figure 12:
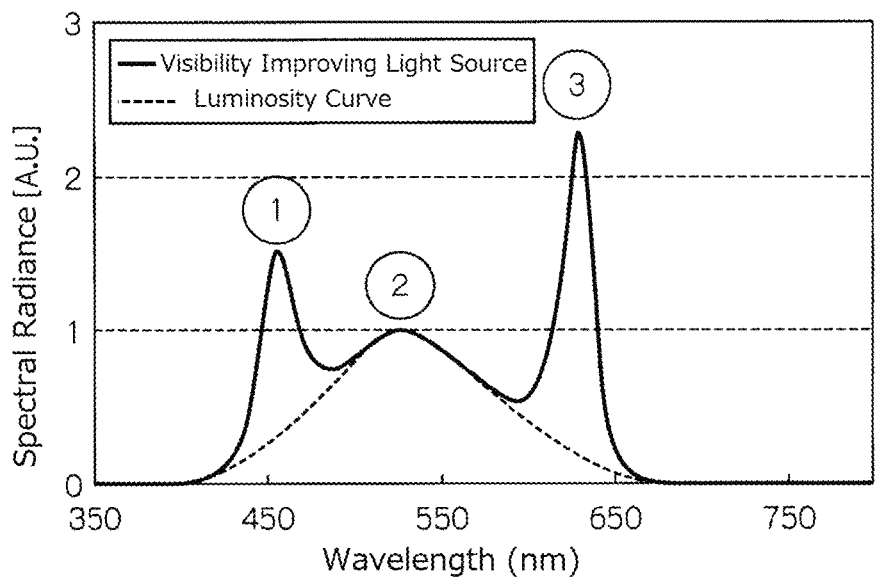
FIG. 12 is a graph showing an exemplary spectral distribution of a model light source which can facilitate the earlier awareness with peripheral vision expected on the basis of the curve of the luminosity factor.

FIG. 10 is a graph showing a spectral distribution of the LED 5500K (new 1), and FIG. 11 is a graph showing a spectral distribution of the LED 5500K (new 2). Further, FIG. 12 is a graph showing an exemplary spectral distribution of a model light source which can facilitate the earlier awareness with peripheral vision expected on the basis of the curve of the luminosity factor. The light source as shown in FIG. 12 can achieve the provision of white light by combining the blue light from the blue LED element (encircled numeral 1 in FIG. 12), the green light from the green phosphor excited by the blue light from the blue LED element (encircled numeral 2 in FIG. 12, and the red light from the red LED element (encircled numeral 3 in FIG. 12). As understood from the spectral distribution of FIG. 12, the peak of numeral 2 is matched to the luminosity curve, and therefore, the light source can provide the sense of efficiently enhanced brightness.

With reference to FIGS. 10 and 11, it can be confirmed that the spectral distributions of the LED 5500K (new 1) and the LED 5500K (new 2) are close to those which are expected to facilitate the earlier awareness with peripheral vision.

The procedures of the Experiment can be described as follows. First, as shown in FIG. 6, a display displaying Japanese hiragana characters was disposed in front of a test subject 2 m away from the test subject. While the test subject was gazing on the display to read the characters, gray color plates were randomly presented on right and left sides with respect to the center front at angular positions of 30°, 45°, 60°, or 75° where the gray color plates were illuminated with light at constant luminance of 1, 0.1 or 0.01 cd/m$^2$.

Then, the time period (reaction time (RT) after the light source was lit (to provide white light) till the time when the test subject became aware of the presented light (reflected light from the gray color plates) and pressed a button on hand was measured. Following the above procedures, the measurements were carried out with every light source.

The set value of the luminance of the light source used in Experiments includes three levels of 1.0, 0.1, and 0.01 cd/m$^2$, and the background luminance was 1 cd/m$^2$. The number of test subjects was 4 persons below the age of 45 and 4 persons over the age of 45.

The present inventors analyzed the measured results and found that the persons over the age of 45 showed faster reaction speeds as the S/P ratio increased and as a result the missing-out rate was lowered. Specifically, the present inventors have found that the persons over the age of 45 become aware of peripheral objects with peripheral vision as the S/P ratio increases.

Figure 13:
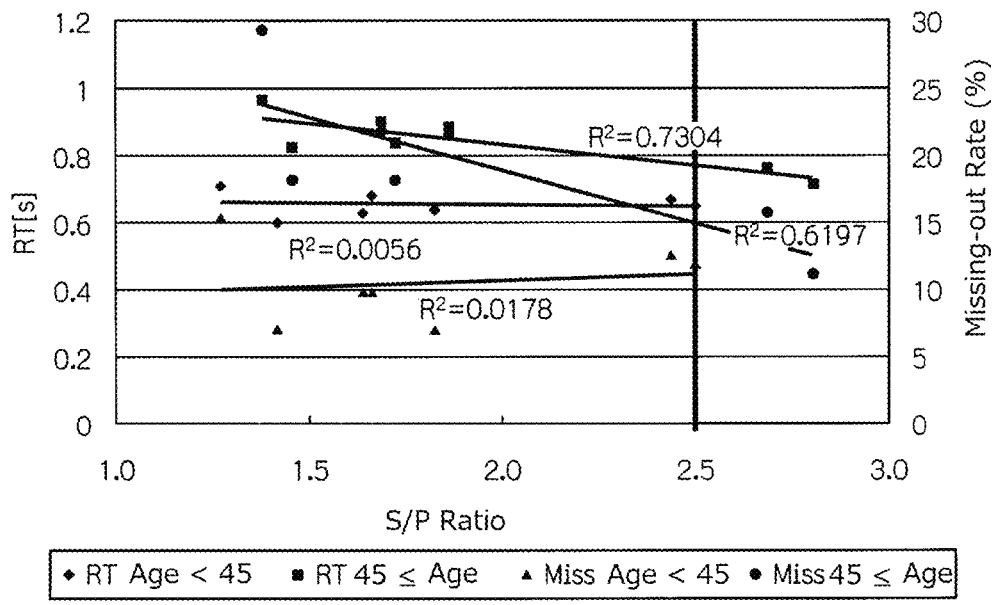
FIG. 13 is a graph showing measurement results (average values) in Experiment 2 which are plotted in a coordinate system of the S/P ratio as a horizontal axis and the reaction time RT and the missing-out rate as a vertical axis.
Figure 14:
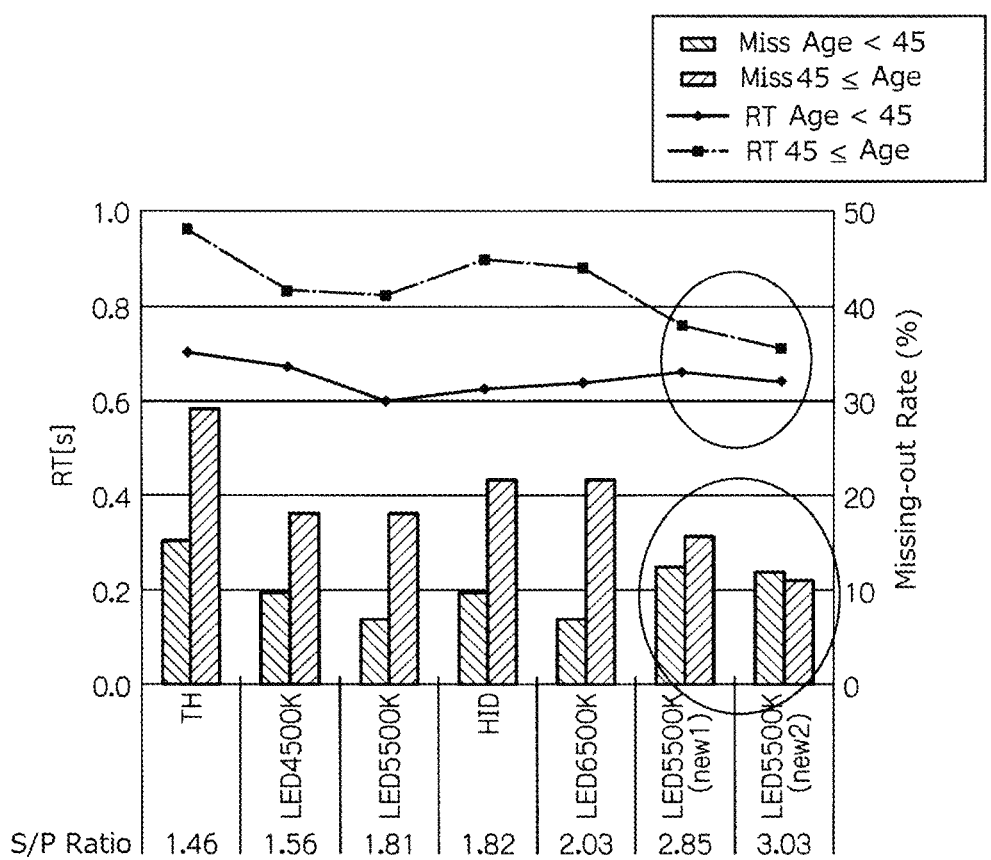
FIG. 14 is a graph showing measurement results (average values of the reaction time RT and the missing-out rate) in Experiment 2 which are plotted in the coordinate system of the S/P ratio as the horizontal axis and the reaction time RT and the missing-out rate as the vertical axis.

The measurement results are shown in FIGS. 13 and 14. FIG. 13 is a graph showing the measurement results (average values) which are plotted in a coordinate system of the S/P ratio as a horizontal axis and the reaction time RT and the missing-out rate as a vertical axis. Note that the missing-out rate is determined as a rate of cases where the time period from when the light source is lit till when a test subject becomes aware of the presented light exceeds 2 seconds. The numerals in FIG. 13 represent the determination coefficients for the respective data groups. FIG. 14 is a graph showing measurement results (average values of the reaction time RT and the missing-out rate) which are plotted in the coordinate system of the S/P ratio as the horizontal axis and the reaction time RT and the missing-out rate as the vertical axis.

With reference to FIG. 13, it was found that the persons over the age of 45 showed faster reaction speeds as the S/P ratio increased to 2.0 or more and as a result the missing-out rate was lowered. Specifically, the present inventors have found that the persons over the age of 45 become aware of peripheral objects with peripheral vision as the S/P ratio increases.

Based on these findings, if light emitted from the light source having the S/P ratio being 2.0 or more is projected to the peripheral area in front of the vehicle body, it is possible to configure a vehicle headlight in which the earlier awareness with the peripheral vision under dark environment (e.g., during nighttime driving) can be facilitated (the reaction speed is shortened and the missing-out rate is lowered.). Note that with regard to the test subjects below the age of 45 the reaction time and the missing-out rate were not varied with the increased S/P ratio, meaning that there is no correlation between them. Further, based on the correlation between the S/P ratio and the missing-out rate with reference to FIG. 13, it was found that the difference of awareness depending on the age disappears when the S/P ratio is 2.5 or more.

Based on these findings, if light emitted from the light source having the S/P ratio being 2.5 or more is projected to the peripheral area in front of the vehicle body, it is possible to configure a vehicle headlight in which the difference of awareness depending on the age under dark environment (e.g., during nighttime driving) does not occur.

Further, when the LED 5500K (new 1) and the LED 5500K (new 2) as shown in FIG. 14 are compared with other light sources, the LED 5500K (new 1) and the LED 5500K (new 2) can decrease the difference between the reaction times RT for the persons below and over the age of 45 as well as the difference of the missing-out rate therebetween.

Further, when the LED 5500K (new 1) and the LED 5500K (new 2) as shown in FIG. 14 are compared with other light sources, the LED 5500K (new 1) and the LED 5500K (new 2) can shorten the reaction time RT for the persons over the age of 45 as well as can lower the missing-out rate.

Experiment 2

The present inventors have conducted the following experiment in order to confirm the influence of light from light sources with various S/P ratios (in particular, 2.0 or more) on the awareness with peripheral vision (equal to the use of rod cells, meaning the scotopic sensitivity) under dark environment during actual nighttime driving.

Figure 15:
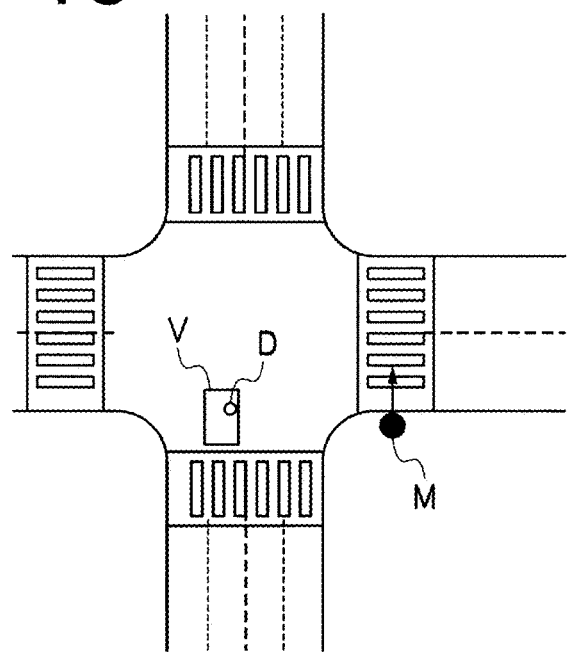
FIG. 15 is a diagram illustrating the environment where Experiment 2 was performed.

FIG. 15 is a diagram illustrating the environment where Experiment 2 was performed.

In the Experiment performed, as shown in FIG. 15, assuming a vehicle turning right at an intersection, a vehicle V was stopped in the area of the intersection. Then, a pedestrian M was placed at the closer side of the pedestrian's crosswalk which was positioned in the traveling direction of the vehicle V turning right (the area is considered as a blind area for the driver D). Three light sources with different S/P ratios (1.5, 2.0, and 2.5) were used as a light source of the vehicle headlight.

The light sources with the respective S/P ratios of 1.5 and 2.0 were white LEDs prepared by combining a blue LED element with a yellow phosphor and adjusting the concentration of the yellow phosphor to provide the respective S/P ratios.

The light source with the S/P ratio of 2.5 was a white LED prepared by combining blue and red LED elements with a green phosphor and adjusting the concentration of the green phosphor to provide the S/P ratio.

The experiment was conducted according to the following procedures. The time period when the driver D becomes aware of the pedestrian M after the pedestrian M started to walk from the closer side of the crosswalk to the opposite side was measured. All the light sources were measured by performing the above experiment. The number of test subjects was 4 persons below the age of 45 and 4 persons over the age of 45.

The measurement results are shown in Table 3.

TABLE 3

| S/P ratio | Walking distance till becoming aware (below the age of 45) | Walking distance till becoming aware (over the age of 45) |
| --- | --- | --- |
| 1.5 | 2.91 m | 3.25 m |
| 2.0 | 2.78 m | 3.11 m |
| 2.5 | 2.65 m | 2.95 m |

With reference to Table 3, it is understood in both the cases of the persons below and over the age of 45 that as the S/P ratio increases, the walking distance till becoming aware decreases.

For example, in the case of the persons below the age of 45, when comparing the light source having the S/P ratio of 1.5 with the light source having the S/P ratio of 2.5, it is understood that the test subjects (drivers) become aware 26 cm earlier in the case of the light source having the S/P ratio of 2.5 than in the case of the light source having the S/P ratio of 1.5. If the walking speed is assumed to be 50 cm/sec, the test subjects can become aware 0.52 seconds (26/50 seconds) faster in the case of the light source having the S/P ratio of 2.5 than in the case of the light source having the S/P ratio of 1.5. If the vehicle speed is assumed to be 1 msec, the test subjects can stop the vehicle by 52 cm farther from the pedestrian in the case of the light source having the S/P ratio of 2.5 than in the case of the light source having the S/P ratio of 1.5.

Similarly, in the case of the persons below the age of 45, when comparing the light source having the S/P ratio of 1.5 with the light source having the S/P ratio of 2.0, it is understood that the test subjects (drivers) become aware 13 cm earlier in the case of the light source having the S/P ratio of 2.0 than in the case of the light source having the S/P ratio of 1.5. If the walking speed is assumed to be 50 cm/sec, the test subjects can become aware 0.26 seconds (13/50 seconds) faster in the case of the light source having the S/P ratio of 2.0 than in the case of the light source having the S/P ratio of 1.5. If the vehicle speed is assumed to be 1 msec, the test subjects can stop the vehicle by 26 cm farther from the pedestrian in the case of the light source having the S/P ratio of 2.0 than in the case of the light source having the S/P ratio of 1.5.

On the other hand, in the case of the persons over the age of 45, when comparing the light source having the S/P ratio of 1.5 with the light source having the S/P ratio of 2.5, it is understood that the test subjects (drivers) become aware 30 cm earlier in the case of the light source having the S/P ratio of 2.5 than in the case of the light source having the S/P ratio of 1.5. If the walking speed is assumed to be 50 cm/sec, the test subjects can become aware 0.6 seconds (30/50 seconds) faster in the case of the light source having the S/P ratio of 2.5 than in the case of the light source having the S/P ratio of 1.5. If the vehicle speed is assumed to be 1 msec, the test subjects can stop the vehicle by 60 cm farther from the pedestrian in the case of the light source having the S/P ratio of 2.5 than in the case of the light source having the S/P ratio of 1.5.

Similarly, in the case of the persons over the age of 45, when comparing the light source having the S/P ratio of 1.5 with the light source having the S/P ratio of 2.0, it is understood that the test subjects (drivers) become aware 14 cm earlier in the case of the light source having the S/P ratio of 2.0 than in the case of the light source having the S/P ratio of 1.5. If the walking speed is assumed to be 50 cm/sec, the test subjects can become aware 0.28 seconds (14/50 seconds) faster in the case of the light source having the S/P ratio of 2.0 than in the case of the light source having the S/P ratio of 1.5. If the vehicle speed is assumed to be 1 msec, the test subjects can stop the vehicle by 28 cm farther from the pedestrian in the case of the light source having the S/P ratio of 2.0 than in the case of the light source having the S/P ratio of 1.5.

As described, in both the cases of the persons below and over the age of 45 under dark environment during actual nighttime driving, as the S/P ratio increases, the walking distance of the pedestrian till the driver becomes aware of the pedestrian (time period (seconds) till the driver becomes aware of the pedestrian) is shortened, whereby the driver can stop the vehicle well before reaching the pedestrian. Therefore, it has been confirmed that as the S/P ratio increases, an earlier awareness with peripheral vision can be achieved.

Next, Table 4 shows the reaction time RT and the missing-out rate for the persons over the age of 45 in the cases of the halogen bulb, the HID bulb, and the white LED. The light source with the S/P ratio of 2.5 was a white LED prepared by combining blue and red LED elements with a green phosphor and adjusting the concentration of the green phosphor to provide the S/P ratio. The number of test subjects was 4 persons below the age of 45 and 4 persons over the age of 45.

TABLE 4

| S/P ratio | | RT [sec] | Missing-out rate [%] |
| --- | --- | --- | --- |
| 1.46 | (Halogen bulb) | 0.91 | 24 |
| 1.82 | (HID) | 0.87 | 21 |
| 2.5 | | 0.79 | 16 |

The reaction time RT was shortened by 0.12 seconds and the missing-out rate was decreased by 8% when the light source having the S/P ratio of 2.5 is compared with the halogen bulb. With reference to Table 4, when the light source having the S/P ratio of 2.5 was used, the reaction time RT was 0.79 seconds, which substantially corresponds to the generally known reaction time during driving of 0.7 to 0.9 seconds (the time from when a driver determines the danger to when the brake is activated.).

Experiment 3

Conventionally, it had been unknown heretofore that the S/P ratio influences how the traffic sign colors can be seen.

The present inventors conducted the following experiments to confirm the influence of the S/P ratio on the traffic sign colors as to how they are observed under dark environment (e.g., during nighttime driving).

Figure 16:
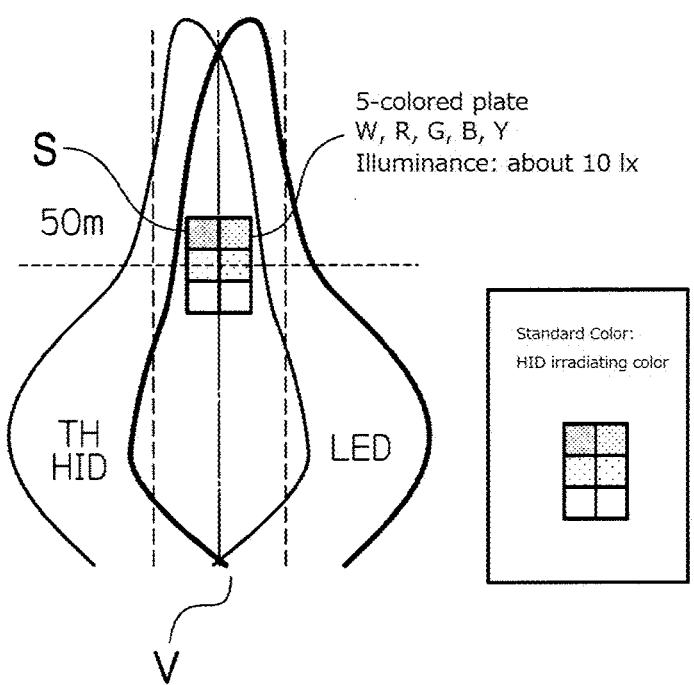
FIG. 16 is a diagram illustrating the environment where Experiment 3 was performed.

FIG. 16 is a diagram illustrating the environment where Experiment 3 was performed.

In the experiment, as shown in FIG. 16, a parked automobile V is positioned 50 m away from a color plate S painted with 5 colors (including a typical five color set, i.e., white, red, green, blue, and yellow). Five light sources with different S/P ratios as listed in Table 5 were adopted as a light source of a vehicle headlight.

TABLE 5

| Light source | S/P ratio |
| --- | --- |
| Halogen bulb | 1.46 |
| HID bulb | 1.75 |
| LED 4500K | 1.52 |
| LED 5500K | 1.80 |
| LED 6500K | 1.98 |

The light sources of LED 4500K, LED 5500K, and LED 6500K were white LEDs prepared by combining a blue LED element with a yellow phosphor and adjusting the concentration of the yellow phosphor to provide the particular correlated color temperature and the S/P ratio as shown in Table 5.

The procedures of the Experiment can be described as follows. The 5-colored plate (white, red, green, blue, and yellow) was irradiated with light (illuminance: about 10 lx), and the difference in vision of the color plate was evaluated on the basis of the subjective evaluation scale (3: the same as when the HID bulb is used, 1: unclear and dull, 2: between the evaluations 1 and 3, 5: sharp and clear, and 4: between evaluations 3 and 5). Following the above procedures, the measurements were carried out with every light source. The number of test subjects was 16 Japanese and 43 Americans.

The present inventors have analyzed the evaluation results, and found that the light source with the high S/P ratio can cause persons regardless of race to become aware of objects clearly and sharply and also found that the light source with high S/P ratio, in particular, of 1.8 or more can cause persons to become aware of objects colored white, blue, and green clearly.

Figure 17A:
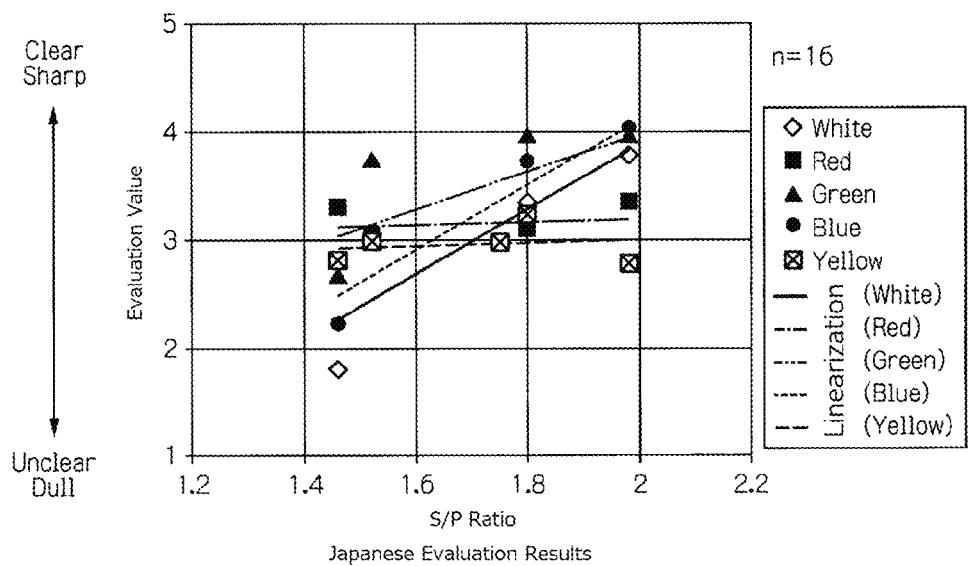
FIGS. 17A and 17B are a graph showing evaluation values (average values) evaluated by Japanese in Experiment 3 in a coordinate system of the S/P ratio as a horizontal axis and the evaluation scale as a vertical axis, and a graph showing evaluation values (average values) evaluated by Americans in Experiment 3 in a coordinate system, respectively.
Figure 17B:
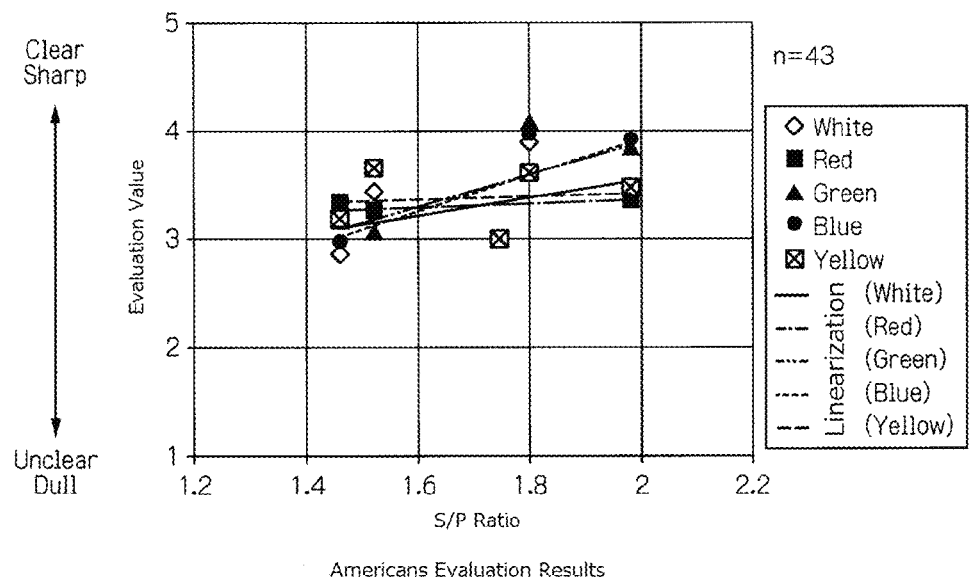

FIGS. 17A and 17B are a graph showing evaluation values (average values) evaluated by Japanese in a coordinate system of the S/P ratio as a horizontal axis and the evaluation scale as a vertical axis, and a graph showing evaluation values (average values) evaluated by Americans in Experiment 3 in a coordinate system, respectively.

With reference to FIGS. 17A and 17B, the evaluation value for the light source with the high S/P ratio is higher than 3, which is a standard, and the light source with the high S/P ratio can cause persons regardless of race to become aware of objects clearly and sharply. In addition, it is found that the light source with high S/P ratio, in particular, of 1.8 or more can cause persons to become aware of an object colored white, blue, and green clearly.

Based on these findings, if the light emitted from a light source with a high S/P ratio of 1.8 or more is projected onto a traffic sign, the sign can be observed clearly and sharply under dark environment (e.g., during nighttime driving), meaning that a vehicle headlight having such a light source can be configured.

Experiment 4

Conventionally, it had been unknown heretofore that the S/P ratio influences how the sense of brightness (luminance difference between the reference light source and the test subject light source) can be seen.

The present inventors conducted the following experiments to confirm the influence of the S/P ratio on the sense of brightness under dark environment (e.g., during nighttime driving).

Figure 18:
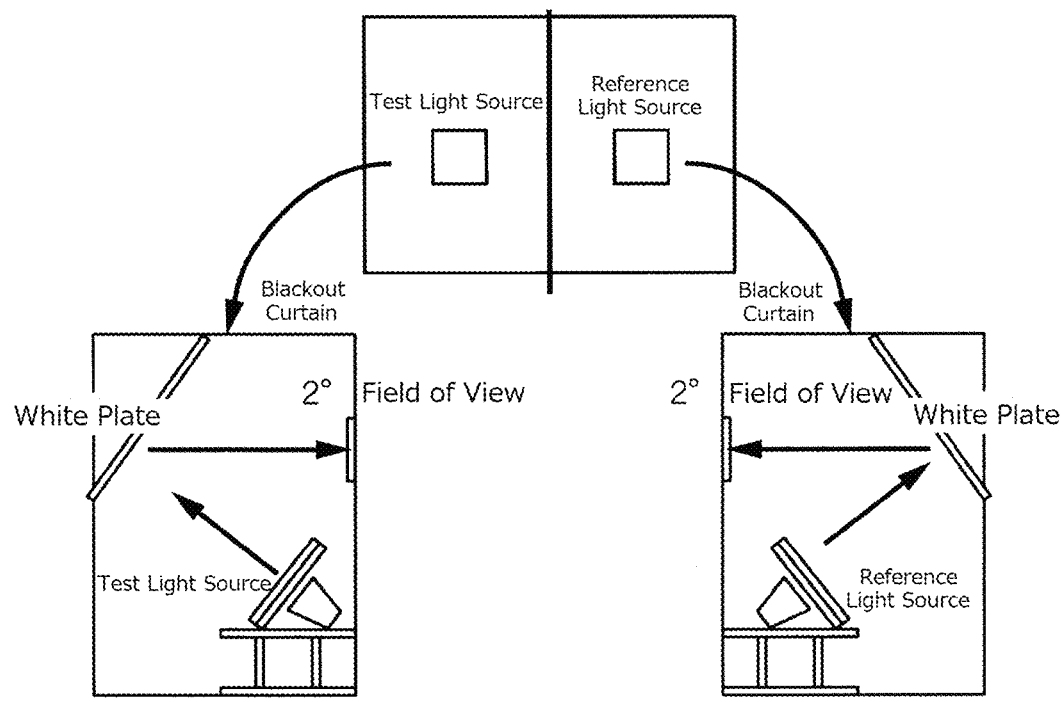
FIG. 18 is a diagram illustrating the configuration of an exemplary device used in Experiment 4.

FIG. 18 is a diagram illustrating the configuration of an exemplary device used in Experiment 4.

In Experiment 4, the device shown in FIG. 18 was used and three white LEDs with different correlated color temperatures and S/P ratios as shown in Table 6 were used as the test light source.

TABLE 6

| Test light source | S/P ratio |
| --- | --- |
| LED 3800K | 1.54 |
| LED 5300K | 1.82 |
| LED 5800K | 1.98 |

Further, two light sources with different S/P ratios as shown in Table 7 were used as the reference light source.

TABLE 7

| Reference light source | S/P ratio |
| --- | --- |
| Halogen bulb | 1.46 |
| HID bulb | 1.75 |

The light sources of LED 3800K, LED 5300K, and LED 5800K were white LEDs prepared by combining a blue LED element with a yellow phosphor and adjusting the concentration of the yellow phosphor to provide the particular correlated color temperature and the S/P ratio as shown in Table 5.

The procedures of the Experiment can be described as follows. The test light source is observed by one of a subject's eyes while the reference light source is observed by the subject's other eye. In this state, the test subject is allowed to adjust the current value for the test light source so that the brightness of the test light source coincides with that of the reference light source. Then, the spectral radiance characteristics of the adjusted test light source are measured, and then the brightness difference (luminance difference) between the reference light source and the test light source is calculated. Following the above procedures, the measurements were carried out with every light source. The number of test subjects was 16.

The present inventors have analyzed the evaluation results, and found that the white LED light source with the higher S/P ratio can enhance the sense of brightness.

Figure 19:
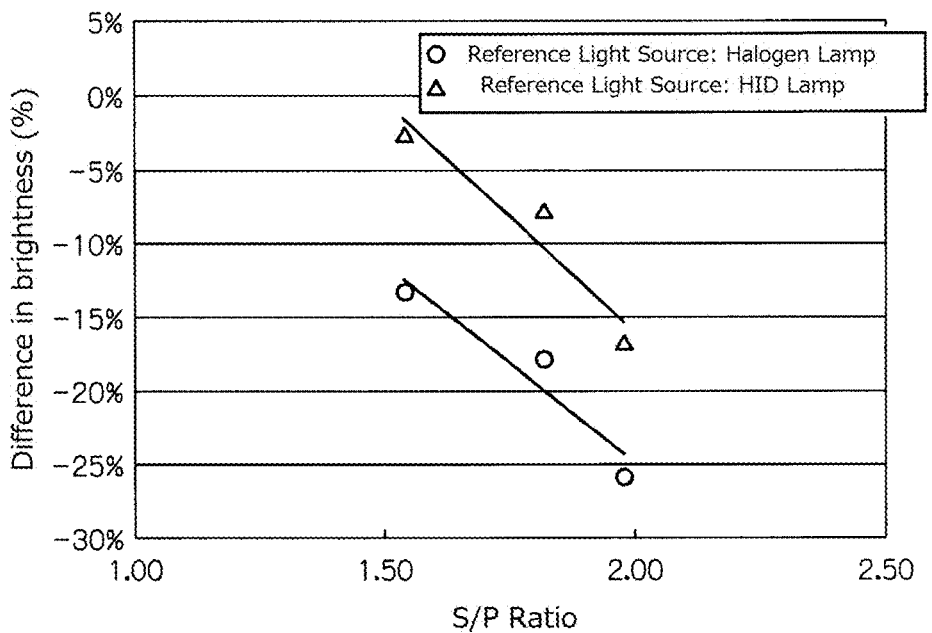
FIG. 19 is a graph showing measurement results (average values) in Experiment 4 which are plotted in a coordinate system of the S/P ratio as the horizontal axis and the sense of brightness as the vertical axis.

FIG. 19 is a graph showing the difference in brightness between the reference light source and the test light source as measurement results (average values) which are plotted in a coordinate system of the S/P ratio as the horizontal axis and the luminance difference when the brightness of the test light source was sensed as the same as that of the reference light source as the vertical axis.

As shown in FIG. 14, the brightness difference value is a negative value. This means the test light source can provide the same brightness as the reference light source while the test light source provides smaller luminance value than the reference light source. Accordingly, as shown in FIG. 14, as the S/P ratio increases, the graph shows the downward-sloping curve. Furthermore, it can be found that as the S/P ratio of the white LED increases, the sense of brightness is enhanced (the luminance difference between the reference light source and the test light source), and that the white LED can provide the sense of brightness increased by about 13 to 26% with respect to the halogen bulb and by about 3 to 17% with respect to the HID bulb (the luminance difference between the reference light source and the test light source).

Experiment 5

The present inventors conducted the following experiments to confirm the influence of the S/P ratio on the sense of brightness under dark environment during actual nighttime driving.

In the experiments, three light sources with different correlated color temperatures and S/P ratios as shown in Table 8 were used as the test light source for a vehicle headlight.

TABLE 8

| Light source for headlight | S/P ratio |
|---|---|
| HID bulb | 1.75 |
| LED 4500K | 1.52 |
| LED 5500K | 1.80 |

The light sources of LED 4500K and LED 5500K were LEDs prepared by combining a blue LED element with a yellow phosphor and adjusting the concentration of the yellow phosphor to provide the particular correlated color temperature and the S/P ratio as shown in Table 8.

The procedures of the Experiment can be described as follows. The vehicle headlight is energized to emit light in a prescribed light distribution pattern at a closer area in front of a vehicle body (an area of a road surface in front of the vehicle on the own lane), and a driver (test subject) is allowed to observe the light distribution pattern and to state the area from which the driver feels the largest sense of brightness. Then, the distance to the area and the illuminance at the area are measured. Following the above procedures, the measurements were carried out with every light source. The number of test subjects was 5.

The present inventors have analyzed the evaluation results, and found that even when the illuminance increases, the area from which the driver feels the sense of brightness is not increased, and that as the S/P ratio increases, the area from which the driver feels the sense of brightness is enhanced. This means that the sense of brightness at the closer road surface area in front of the vehicle body is correlated not with the illuminance, but with the S/P ratio. Accordingly, the present inventors have found that it is possible to enhance the sense of brightness at the closer road surface area in front of the vehicle body by not necessarily increasing the illuminance, but the S/P ratio.

Figure 20:
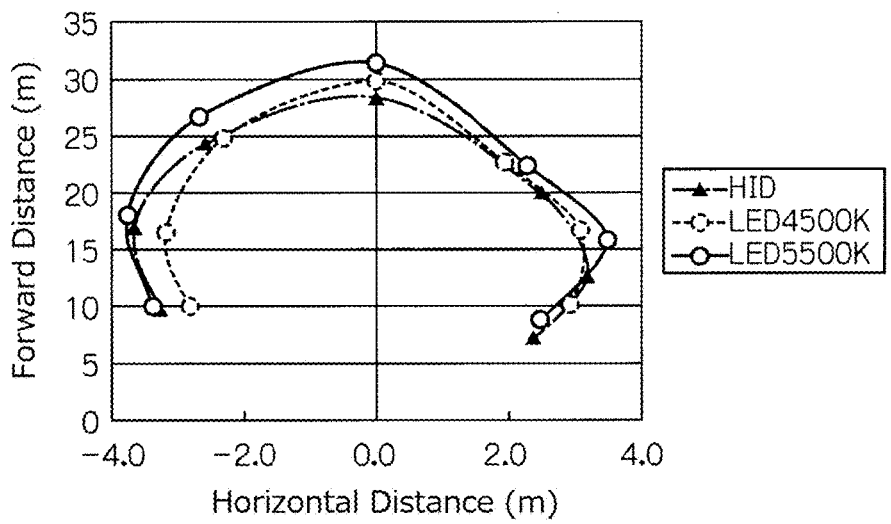
FIG. 20 is a graph showing measurement results (average values) in Experiment 5 which are plotted in a coordinate system of the horizontal distance from the center of the vehicle body as the horizontal axis and the forward distance from the front end of the vehicle body as the vertical axis.
Figure 21:
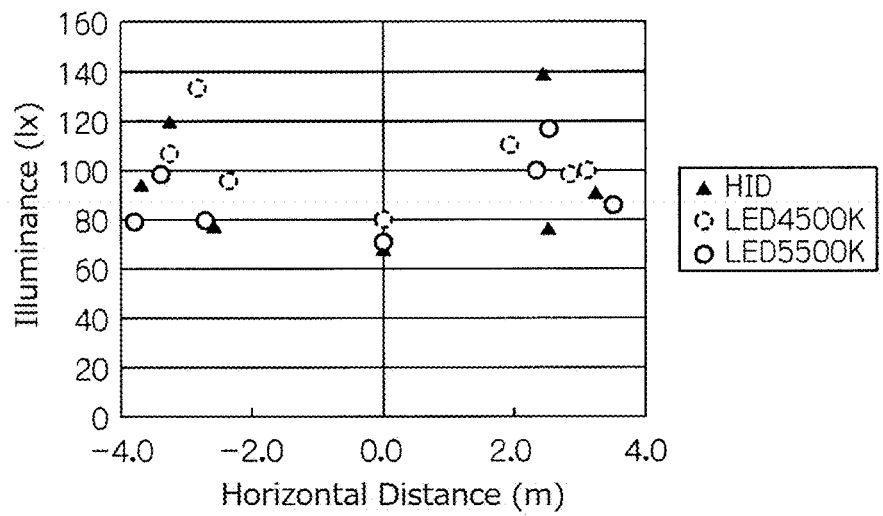
FIG. 21 is a graph showing measurement results (average values) in Experiment 5 which are plotted in a coordinate system of the horizontal distance from the center of the vehicle body as the horizontal axis and the illuminance as the vertical axis.

The measurement results are shown in FIGS. 20 and 21. FIG. 20 is a graph showing measurement results (average values) which are plotted in a coordinate system of the horizontal distance from the center of the vehicle body as the horizontal axis and the forward distance from the front end of the vehicle body as the vertical axis. FIG. 21 is a graph showing measurement results (average values) which are plotted in a coordinate system of the horizontal distance from the center of the vehicle body as the horizontal axis and the illuminance as the vertical axis.

With reference to FIGS. 15 and 16, it can be confirmed that the LED 5500K with the high S/P ratio can create an area in which a driver feels the sense of brightness is wider than with respect to other light sources, that the illuminance thereof is equal to or less than those of the other light sources, and that, when the illuminance is the same, the LED 5500K with the high S/P ratio can widen the area from which a driver feels the sense of brightness more than with respect to the other light sources. Specifically, it can be confirmed that the sense of brightness at the closer road surface area in front of the vehicle body is correlated not with the illuminance, but with the S/P ratio. Accordingly, it can be confirmed that it is possible to enhance the sense of brightness at the closer road surface area in front of the vehicle body by increasing not the illuminance but the S/P ratio.

Based on these findings, if the light emitted from a light source with the high S/P ratio of 2.0 or more is projected onto the closer road surface area in front of the vehicle body, the sense of brightness felt by the driver at the closer road surface area in front of the vehicle body (an area of a road surface in front of the vehicle on the own lane) under dark environment (e.g., during nighttime driving) can be enhanced

[Exemplary Light Distribution Patterns that Facilitate the Earlier Awareness with the Peripheral Vision]

Based on the above-described findings from the respective Experiments 1 to 5, the present inventors have examined light distribution patterns that facilitate earlier awareness using peripheral vision.

A description will now be given of the exemplary light distribution patterns that facilitate the earlier awareness with peripheral vision, which have been examined by the present inventors.

Figure 22:
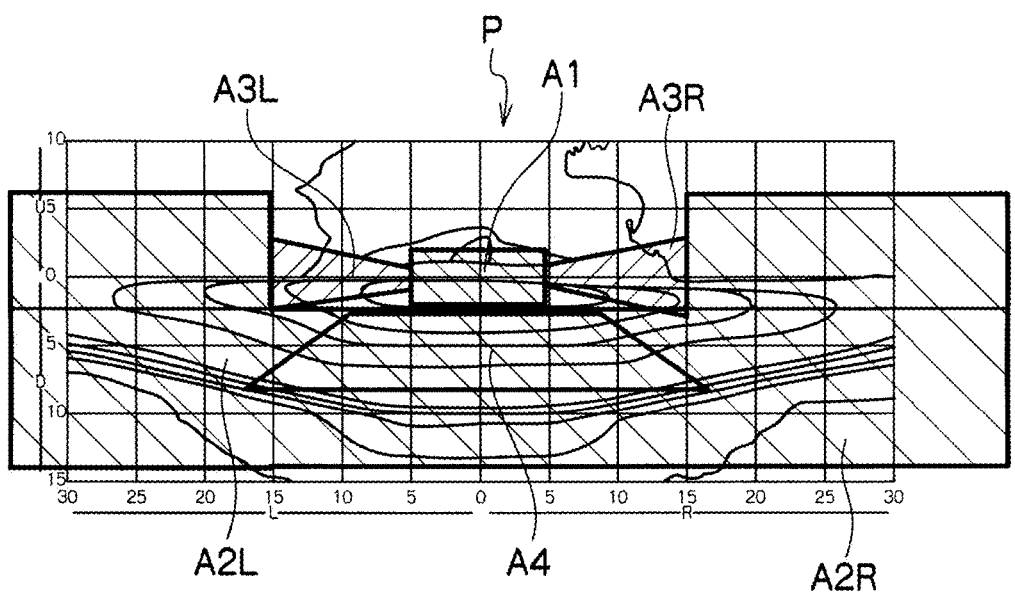
FIG. 22 is a diagram illustrating an exemplary light distribution pattern on a virtual vertical screen, in which the pattern could facilitate earlier awareness with peripheral vision.
Figure 23:
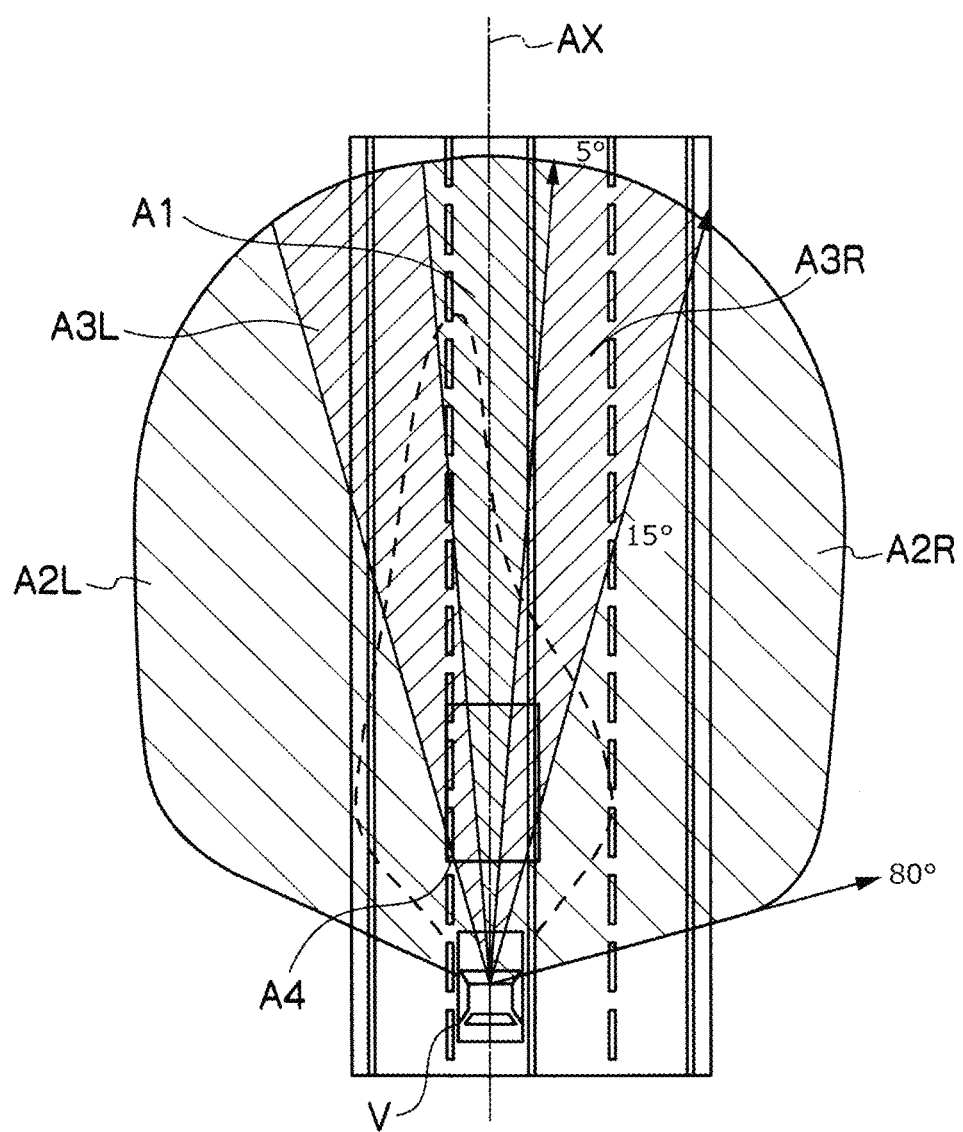
FIG. 23 is a diagram illustrating an exemplary light distribution pattern on a road surface, in which the pattern could facilitate earlier awareness with peripheral vision.
Figure 24:
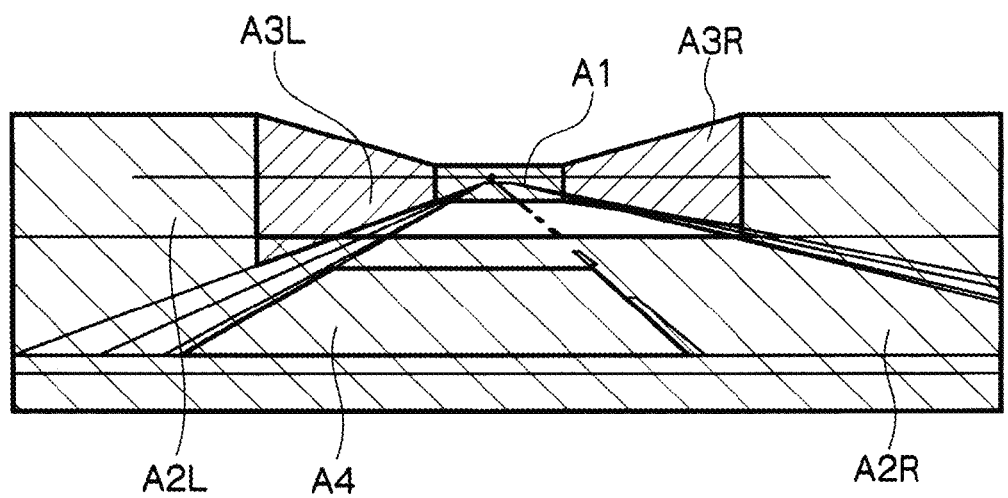
FIG. 24 is a diagram illustrating an exemplary light distribution pattern when viewed by a driver, in which the pattern could facilitate earlier awareness with peripheral vision.

FIG. 22 is a diagram illustrating an exemplary light distribution pattern on a virtual vertical screen, in which the pattern could facilitate the earlier awareness with peripheral vision; FIG. 23 is a diagram illustrating an exemplary light distribution pattern on a road surface, in which the pattern could facilitate the earlier awareness with peripheral vision; and FIG. 24 is a diagram illustrating an exemplary light distribution pattern when viewed by a driver, in which the pattern could facilitate the earlier awareness with peripheral vision.

The light distribution pattern P shown in FIG. 22 is observed as being projected onto the virtual vertical screen in front of the vehicle body (assumed to be disposed about 25 m away from the vehicle body), and can include a central area A1, peripheral areas A2L and A2R, intermediate areas A3, and a near side area (closer area, closer road surface area) A4. The respective areas A1 to A4 can be located at positions (areas) on a road surface as illustrated in FIG. 23, and can be observed by a driver at positions (areas) illustrated in FIG. 24.

The central area A1 corresponds to the central vision (cone cells) of a driver staring into the distance (for example, a vanishing point).

In the present exemplary embodiment, an area, being a high luminance area called a hot zone, surrounded by lines connecting several positions including the intersection of the horizontal center line and the vertical center line on the virtual vertical screen is selected as the central area A1, as shown in FIG. 22. Herein, the several positions to be connected may be included on the virtual vertical screen at a 5° left and 2° upper position, a 5° left and 2° lower position, a 5° right and 2° lower position, a 5° right and 2° upper position, and then the 5° left and 2° upper position.

Figure 25:
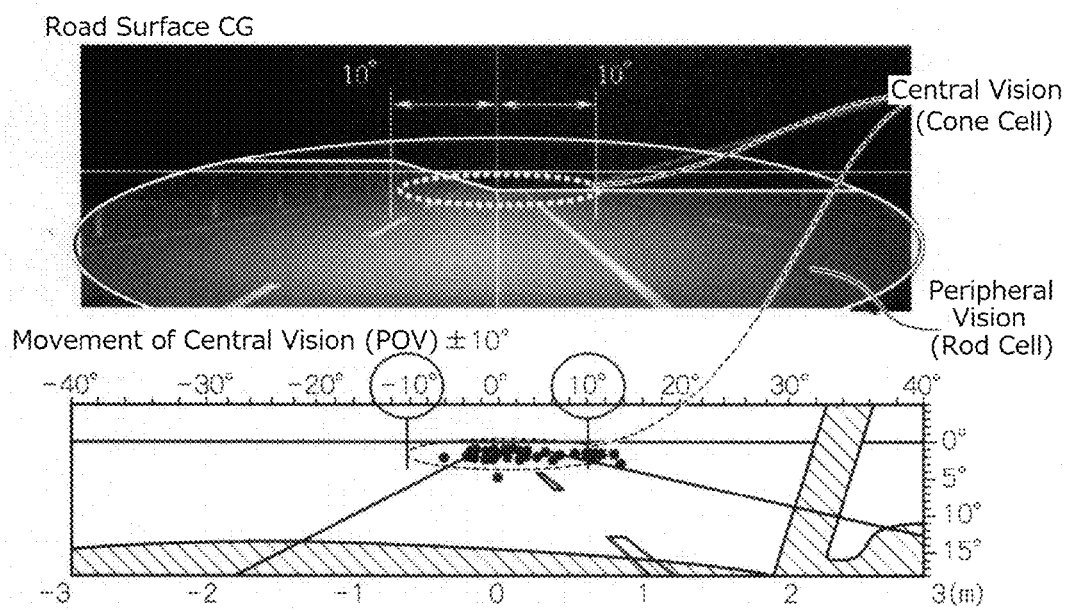
FIG. 25 is a diagram showing the measured positions of line of sight of a driver (eye points)

The positions 5° left and 5° right are included in the central area A1 based on the fact that the positions of line of sight of a driver (eye points) concentrate within a range of 5° left and 5° right. FIG. 25 is a diagram showing the measured positions of line of sight of a driver (eye points). The respective black dots in the lower diagram represent the positions of line of sight of a driver (eye points). With reference to FIG. 20, the black dots concentrate within the range of 5° left and 5° right, meaning that the positions of line of sight of a driver (eye points) concentrate within a range of 5° left and 5° right.

The positions 2° above and below for the central area A1 are set to allow the resulting light source to satisfy a certain law or regulation as well as to form a light distribution pattern with high far-distance visibility. Note that the central area A1 ranging from 5° left to 5° right and from 2° upper to 2° lower is not limitative as long as the central area A1 corresponds to the central vision (cone cells) of a driver staring into the distance (for example, a vanishing point) and the resulting light distribution satisfies a proper law and/or regulation.

The light source with which the central area A1 is illuminated can be a light source having the S/P ratio lower than the light source with which the peripheral areas A2 are illuminated. In the present exemplary embodiment, the light source with which the central area A1 is illuminated can be a light source with the S/P ratio of 1.5, and the light source with which the peripheral areas A2 are illuminated can be a light source with the S/P ratio of 2.0. This is because if the light source with the same S/P ratio as that of the light source with which the peripheral areas A2 are illuminated is used for illuminating the central area A1, glare light may be generated to an opposite vehicle, and this could be prevented by the selected light source used.

Note that the central area A1 can be located on a road surface within an area ranging from 5° left to 5° right with respect to a reference axis Ax extending in the front-to-rear direction of a vehicle body as shown in FIG. 23, and when a driver observes, the central area A1 can be disposed at the position illustrated in FIG. 24.

The light source with which the central area A1 is illuminated can be a light source having the S/P ratio lower than the light source with which the peripheral areas A2 are illuminated, and in the present exemplary embodiment, the light source with which the central area A1 is illuminated can be a light source with the S/P ratio of 1.5, and the light source with which the peripheral areas A2 are illuminated can be a light source with the S/P ratio of 2.0. This can suppress or prevent the generation of glare light to an opposite vehicle.

The peripheral areas A2 correspond to the peripheral vision (cone cells) of a driver staring into the distance (for example, a vanishing point).

In the present exemplary embodiment, areas on either side of the central area A1 and surrounded by lines connecting several positions on the virtual vertical screen are selected as the peripheral areas A2 including a right peripheral area A2R and a left peripheral area A2L, as shown in FIG. 22. Herein, the several positions for the right peripheral area A2R to be connected may include on the virtual vertical screen a 15° right and 6° upper position, a 80° right and 6° upper position, a 80° right and 14° lower position, a 15° right and 14° lower position, and then the 15° right and 6° upper position. Furthermore, the several positions for the left peripheral area A2L to be connected may include on the virtual vertical screen a 15° left and 6° upper position, a 80° left and 6° upper position, a 80° left and 14° lower position, a 15° left and 14° lower position, and then the 15° left and 6° upper position.

Figure 26:
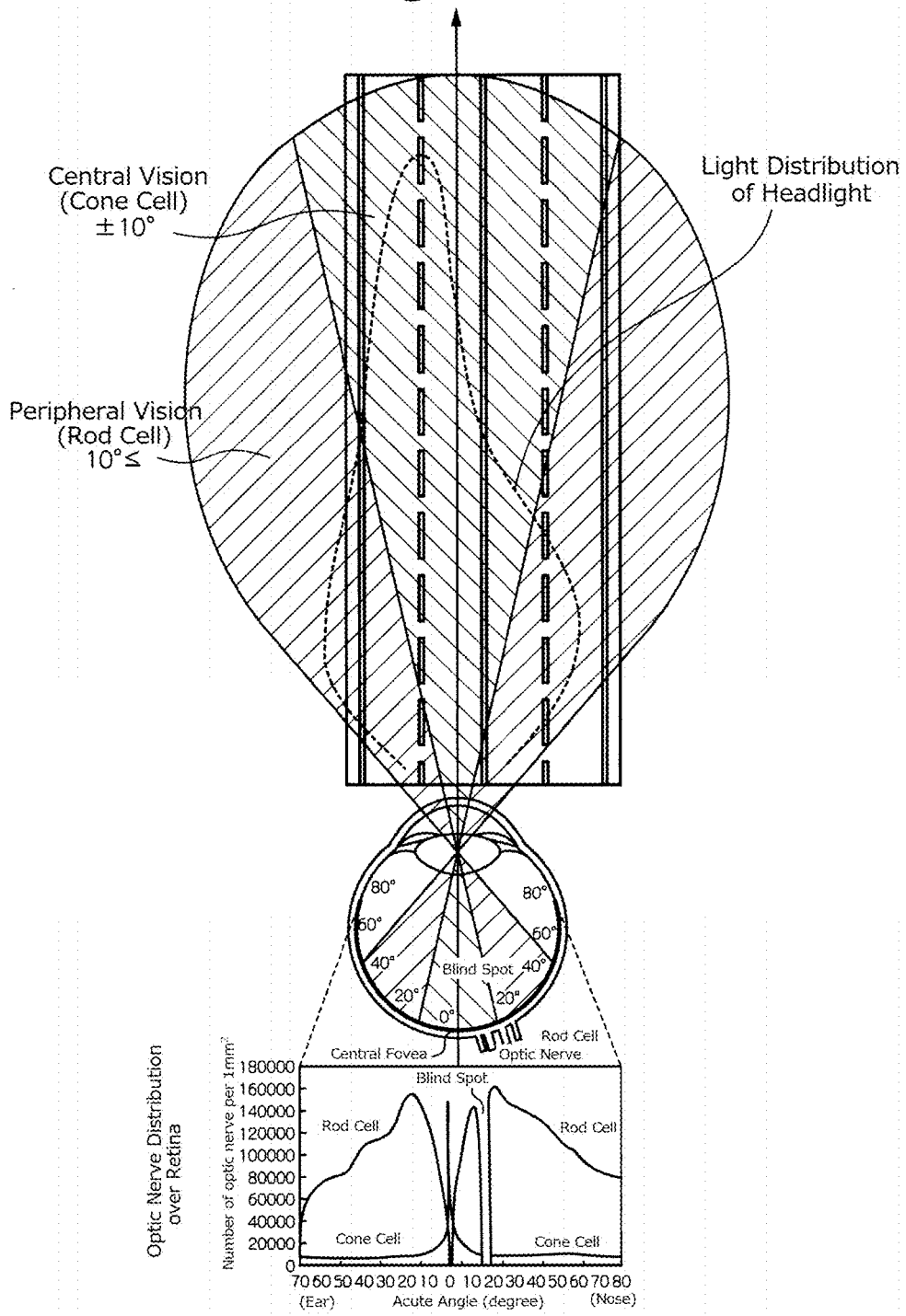
FIG. 26 is an explanatory diagram illustrating the relationship between the central vision, the peripheral vision, the cone cell, and the rod cell of a driver.

The positions from 15° to 80° rightward for the right peripheral area A2R are selected based on the fact that many rod cells are distributed in areas exceeding 15° in the right direction, and to stimulate these rod cells. The same reason is applied to the left peripheral area A2L. With reference to FIG. 26, many rod cells are distributed widely over the ranges exceeding 15° in the right and left directions, respectively. Note that FIG. 26 is an explanatory diagram illustrating the relationship between the central vision, the peripheral vision, the cone cell, and the rod cell of a driver.

The positions from 6° to 14° upward for the right peripheral area A2R are selected mainly to illuminate objects such as a pedestrian with light when turning right at an intersection. The same reason is applied to the left peripheral area A2L.

Note that the peripheral areas A2 (A2R and A2L) ranging from 15° right (left) to 80° right (left) and from 6° upper to 14° lower is not limitative as long as the peripheral areas A2 correspond to the peripheral vision (rod cells) of a driver staring into the distance (for example, a vanishing point) and the resulting light distribution satisfies a proper law and/or regulation.

The light source with which the peripheral areas A2 are illuminated can be a light source having the S/P ratio of 2.0 or more. In the present exemplary embodiment, the light source with which the peripheral areas A2 are illuminated can be a light source with the S/P ratio of 2.0. This is because the earlier awareness with peripheral vision under dark environment (e.g., during nighttime driving) can be achieved (shorten the reaction speed and lower the missing-out rate) on the basis of the findings of Experiments 1 and 2 in which as the S/P ratio increases over 2.0, the earlier awareness with peripheral vision can be achieved (meaning, thereby the reaction speed can be shortened and the missing-out rate can be lowered.).

Note that the peripheral areas A2 can be located on a road surface within an area ranging from 15° right to 80° right and an area ranging from 15° left to 80° left with respect to the reference axis Ax extending in the front-to-rear direction of a vehicle body as shown in FIG. 23, and when a driver observes, the peripheral areas A2 can be disposed at the positions illustrated in FIG. 24.

Figure 27:
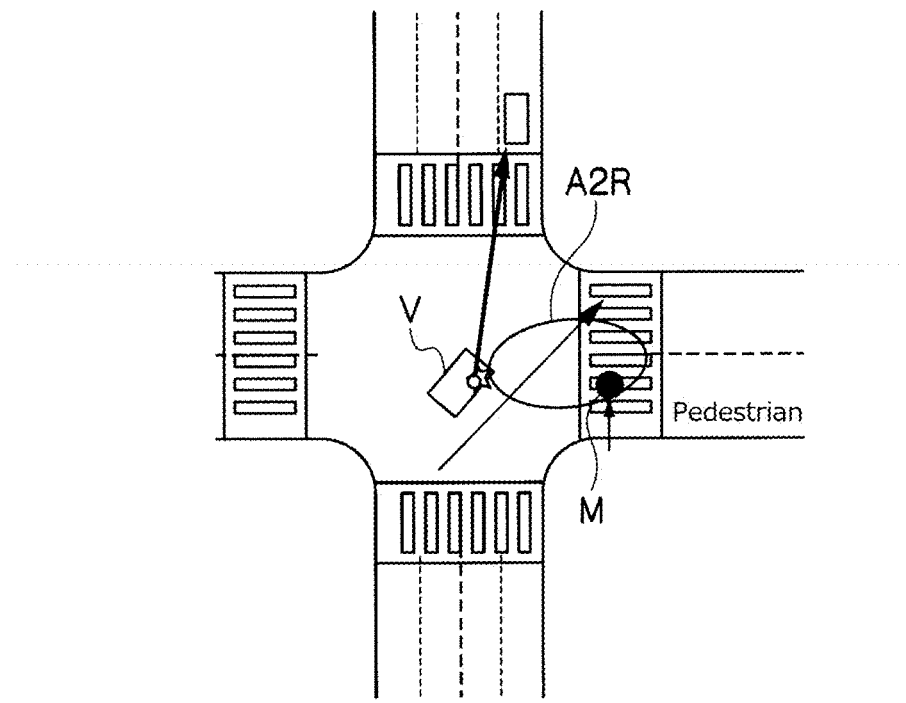
FIG. 27 is a diagram illustrating that earlier awareness of an object such as a pedestrian that exists in the peripheral visual field can be facilitated when a vehicle turns right at an intersection under dark environment (e.g., during nighttime driving)

The light source with which the peripheral areas A2 (A2R, A2L) are illuminated can be a light source having the S/P ratio of 2.0 or more. This can facilitate the earlier awareness of an object such as a pedestrian M existing in a peripheral visional area when the vehicle turns right (or left) as shown in FIG. 27 under dark condition (e.g., during nighttime driving).

The intermediate area A3 can cover an area through which traffic signs relatively move and pass during travelling.

In the present exemplary embodiment, areas between the central area A1 and the peripheral area A2R or A2L and surrounded by lines connecting several positions on the virtual vertical screen are selected as the intermediate areas A3 including a right intermediate area A3R and a left intermediate area A3L, as shown in FIG. 22. Herein, the several positions for the right intermediate area A3R to be connected may include on the virtual vertical screen a 5° right and 0.5° upper position, a 5° right and 1° lower position, a 15° right and 2° lower position, a 15° right and 13° upper position, and then the 5° right and 0.5° upper position. Furthermore, the several positions for the left intermediate area A3L to be connected may include on the virtual vertical screen a 15° left and 3° upper position, a 15° left and 2° lower position, a 5° left and 1° lower position, a 5° left and 0.5° upper position, and then the 15° left and 3° upper position.

The right and left intermediate areas A3R and A3L are disposed to illuminate the signs on either side of a road.

The right intermediate area A3R can be a trapezoid shape with the vertical width increasing as the position is moving outward (from 5° right to 15° right). This is because the signs varying its artificial height during driving should be illuminated with light. The same reason is applied to the case of the left intermediate area A3L. Note, however, that the intermediate areas A3 should not be limited to the trapezoid shape when viewed from a driver as long as the areas through which traffic signs relatively moves during driving can be covered by the intermediate area A3. For example, the intermediate area A3 can be a rectangular shape including the trapezoid shape.

The light source for illuminating the intermediate areas A3 can be a light source with the S/P ratio of 1.8 or more, and in the present exemplary embodiment, with the S/P ratio of 1.8. This is because the high S/P ratio light source (in particular, the light source with the S/P ratio of 1.8 or more) is selected based on the findings that white, blue, and green can be observed sharply and clearly (see Experiment 3), and to cause a driver to observe clearly and sharply traffic signs (in particular, colored white, blue, and/or green) under dark environment (e.g., during nighttime driving).

Note that the intermediate areas A3 can be located on a road surface within an area ranging from 5° right to 15° right and an area ranging from 5° left to 15° left with respect to the reference axis Ax extending in the front-to-rear direction of a vehicle body as shown in FIG. 23, and when a driver observes, the intermediate areas A3 can be disposed at the positions illustrated in FIG. 24.

The light source with which the intermediate areas A3 (A3R, A3L) are illuminated can be a light source having the S/P ratio of 1.8 or more. This can facilitate the clear and sharp observation of traffic signs (in particular, colored white, blue, and/or green) under dark environment (e.g., during nighttime driving).

The near side area A4 can be an area covering the closer area in front of a vehicle body (an area of a road surface in front of the vehicle on the own lane).

In the present exemplary embodiment, an area surrounded by lines connecting several positions below the horizontal center line on the virtual vertical screen is selected as the near side area A4, as shown in FIG. 22. Herein, the several positions to be connected may include on the virtual vertical screen a 9.4° left and 3° lower position, a 17° left and 8° lower position, a 16.7° right and 8° lower position, a 8.3° right and 3° lower position, and then the 9.4° left and 3° lower position.

The near side area A4 can be a trapezoid shape with the horizontal width increasing as the position is moving downward (from 3° lower to 8° lower) on the virtual vertical screen. This is because the light covering the near side area A4 is to illuminate only the closer area in front of the vehicle body on the own lane. Note, however, that the near side area A4 should not be limited to the trapezoid shape when viewed from a driver as long as the area can cover the closer area in front of the vehicle body on the own lane. For example, the near side area A4 can be a rectangular shape including the trapezoid shape.

The light source for illuminating the near side area A4 can be a light source with the S/P ratio of 2.0 or more as in the case of the peripheral areas A3, and in the present exemplary embodiment, with the S/P ratio of 2.0. The S/P ratio of the light source is set to 2.0 or more. This is because, since the sense of brightness in the closer area in front of the vehicle body under dark environment (e.g., during nighttime driving) can be enhanced not by increasing the illuminance but by increasing the S/P ratio on the basis of the findings (see Experiments 4 and 5) in which the sense of brightness at the closer area in front of the vehicle body can be enhanced by not necessarily increasing the illuminance, but the S/P ratio.

The near side area A4 can be arranged, as shown in FIG. 23, at an area 5 m to 15 m away from the front end of the vehicle body with a width of 3.5 m, for example. This can be observed by a driver as shown in FIG. 24.

As described above, the light emitted from the light source with the S/P ratio of 2.0 or more can illuminate the near side area A4 in front of the vehicle body. Therefore, without increasing the illuminance, but increasing the S/P ratio, the sense of brightness at the near side area in front of the vehicle body (the closer area in front of the vehicle body on the own lane) can be enhanced under dark environment (e.g., during nighttime driving).

[Exemplary Configurations of Vehicle Headlight]

A description will now be given of exemplary configurations of vehicle headlights for forming the light distribution pattern P that facilitates the earlier awareness with the peripheral vision as described with reference to FIGS. 22 to 24.

Figure 28:
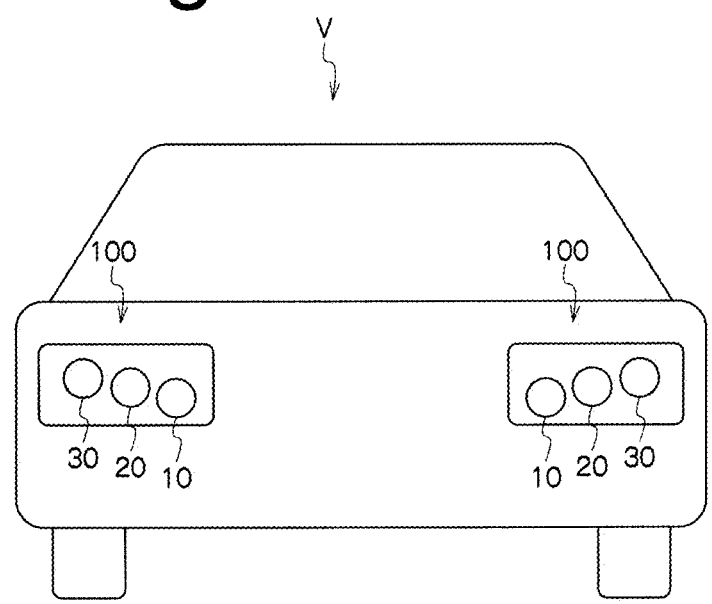
FIG. 28 is a front view of a vehicle body in which the vehicle headlights 100 are installed for forming the light distribution pattern that can facilitate earlier awareness with peripheral vision as shown in FIGS. 22 to 24.
Figure 29A:
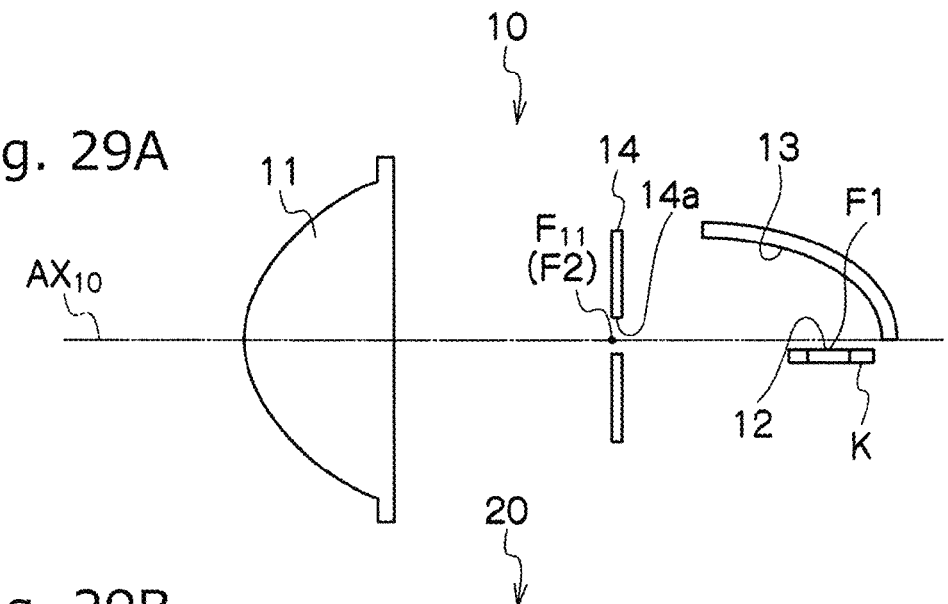
FIGS. 29A, 29B, and 29C each are a cross-sectional view of a lighting unit 10, 20, or 30, respectively, of the vehicle headlight 100 cut along a vertical plane including its optical axis.
Figure 29B:
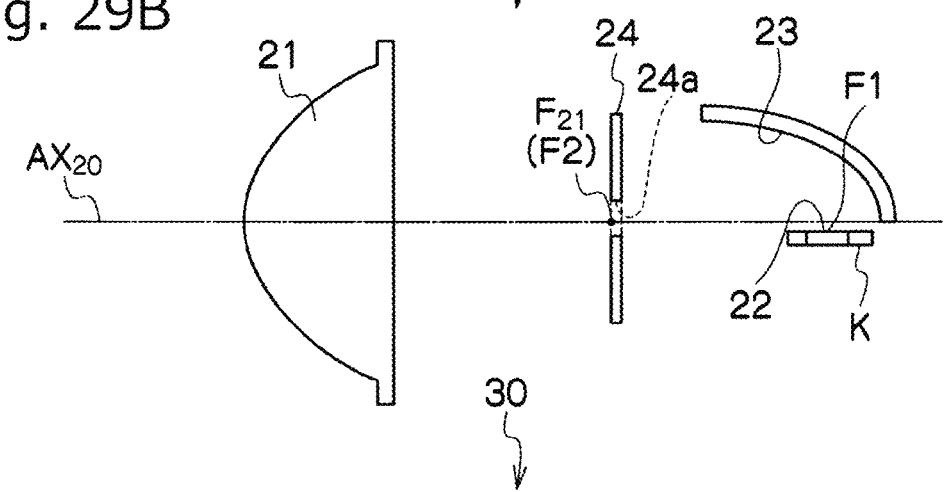
Figure 29C:
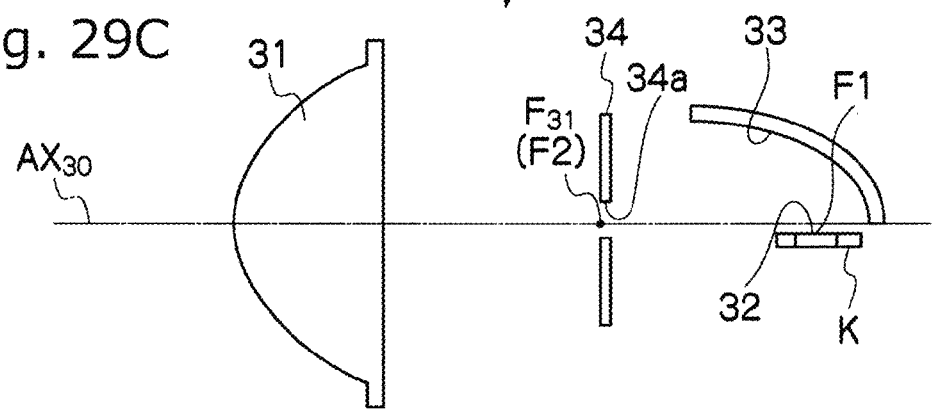

FIG. 28 is a front view of a vehicle body V in which the vehicle headlights 100 are installed for forming the light distribution pattern that can facilitate the earlier awareness with peripheral vision as shown in FIGS. 22 to 24. FIGS. 29A, 29B, and 29C each are a cross-sectional view of a lighting unit 10, 20, or 30 of the vehicle headlight 100 cut along a vertical plane including its optical axis.

As shown in FIG. 28, the vehicle headlight 100 of the present exemplary embodiment can be installed on either side of the front surface of the vehicle body V such as an automobile, and can include three lighting units 10, 20, and 30. Note that each of the lighting units 10, 20, and 30 can be provided with a known aiming mechanism (not shown) connected thereto for adjusting its own optical axis.

[Lighting Unit 10]

The lighting unit 10 can be a projector-type lighting unit configured to illuminate the central area A1 with light. The lighting unit 10, as shown in FIG. 29A, can have an optical axis $AX_{10}$ extending in the vehicle front-to-rear direction and can include a projection lens 11 disposed on the optical axis $AX_{10}$ and having a rear focal point $F_{11}$, a light source 12 disposed behind the rear focal point $F_{11}$ of the projection lens 11 and on or near the optical axis $AX_{10}$, a reflector 13 disposed above the light source 12, a shade 14 disposed between the projection lens 11 and the light source 12 so as to shield part of light from the light source 11, and the like.

The projection lens 11 can be held by a not-shown lens holder or the like so as to be disposed on the optical axis $AX_{10}$. The projection lens 11 can be configured to be a plano-convex aspheric projection lens having a convex front surface (on the front side of the vehicle body) and a plane rear surface (on the rear side of the vehicle body).

The light source 12 can include, for example, four white LEDs with the configuration of a blue LED element and a yellow phosphor in combination, and the white LED can have a light emission surface by 1 mm square, for example. The combination of the blue LED element and the yellow phosphor can be appropriately selected from known ones.

The light source 12 can have the S/P ratio of 1.5 by adjusting the yellow phosphor concentration, so that the emission light satisfies the white area on the CIE chromaticity diagram as stipulated by the particular law. Note that the S/P ratio of the light source 12 is not limited to 1.5. The light source 12 may be a light source the emission light of which satisfies the white area on the CIE chromaticity diagram as stipulated by the particular law and which has an S/P ratio lower than a light source 22 to be described later for illuminating the peripheral areas A2. Herein, the S/P ratio of the light source 22 can be 2.0 and the S/P ratio of the light source 12 can be 1.5 or larger.

A reason why the light source 12 with the S/P ratio lower than the light source 22 for illuminating the peripheral areas A2 is used can be described as follows. For example, when a light source with the same S/P ratio as the light source for illuminating the peripheral areas A2 is used for illuminating the central area A1 (for example, a light source with the S/P ratio of 2.0), glare light may be generated toward an opposite vehicle. The above configuration can prevent this disadvantage.

Further, another reason why the light source 12 with the S/P ratio of 1.5 or more is utilized can be described as follows. That is, when the S/P ratio is lower than 1.5, it is difficult for the emission light from the light source to satisfy the white range on the CIE chromaticity diagram as stipulated by the particular law.

The light source 12 can include not only a white LED, but also a halogen bulb with the S/P ratio of about 1.46 as long as the above requirements for the light source conditions are satisfied.

The light source 12 (including the four white LED, for example) can be mounted on a substrate K while the light emission surface thereof faces upward so that the light source 12 is disposed behind the rear focal point $F_{11}$ of the projection lens 11 and on or near the optical axis $AX_{10}$. Further, the white LEDs 12 can be arranged such that a plurality of (four in the present exemplary embodiment) LEDs are arranged in line at predetermined intervals and symmetric with respect to the optical axis $AX_{10}$ while one of the sides is to extend along a horizontal line perpendicular to the optical axis $AX_{10}$ (in the direction perpendicular to the paper plane of FIG. 29A).

The reflector 13 can be an ellipsoid of revolution or a free curved surface equivalent to an ellipsoid, having a first focal point F1 at or near the light source 12 and a second focal point F2 at or near the rear focal point $F_{11}$ of the projection lens 11.

The reflector 13 can be configured to extend from the deeper side of the light source 12 (the side of the light source 12 on the rear side of the vehicle body as shown in FIG. 29A) to the projection lens 11 while covering above the light source 12. The thus configured reflector 13 can receive the light emitted substantially upward from the light source 12.

Figure 30A:
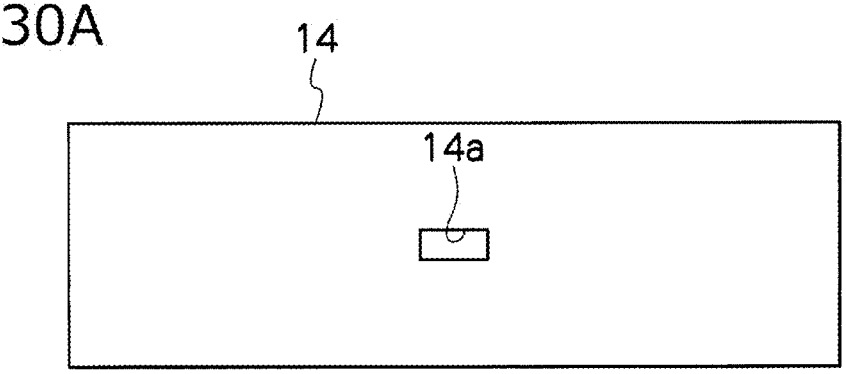
FIGS. 30A, 30B, and 30C are each a respective front view of a shade 14, 24, or 34 of the lighting unit 10, 20, or 30.

FIG. 30A is a front view of the shade 14. As shown in the drawing, the shade 14 can have an opening 14a with a shape corresponding to the central area A1. Specifically, the rear focal point $F_{11}$ of the projection lens 11 can be located at or near the opening 14a.

According to the lighting unit 10 with the above configuration, the light emitted from the light source 12 can be impinge on the reflector 13 and reflected by the same to converge at the rear focal point $F_{11}$ of the projection lens 11, then can pass through the opening 14a of the shade 14 and further through the projection lens 11 to be projected forward. Specifically, the illuminance distribution formed by the light emitted from the light source 12 and passing through the opening 14a of the shade 14 can be reversed and projected forward by the action of the projection lens 11. In this manner, the central area A1 on the virtual vertical screen (assumed to be disposed in front of the vehicle body and approximately 25 meters away from the body) can be illuminated with this light.

Note that, as described above, the lighting unit 10 can be adjusted in terms of its optical axis by a known aiming mechanism (not shown) to illuminate the central area A1.

[Lighting Unit 20]

The lighting unit 20 can be a projector-type lighting unit configured to illuminate the peripheral areas and the near side area A4 with light. The lighting unit 20, as shown in FIG. 29B, can have an optical axis $AX_{20}$ extending in the vehicle front-to-rear direction and can include a projection lens 21 disposed on the optical axis $AX_{20}$ and having a rear focal point $F_{21}$, a light source 22 disposed behind the rear focal point $F_{21}$ of the projection lens 21 and on or near the optical axis $AX_{20}$, a reflector 23 disposed above the light source 22, a shade 24 disposed between the projection lens 21 and the light source 22 so as to shield part of light from the light source 21, and the like.

The projection lens 21 can be held by a not-shown lens holder or the like so as to be disposed on the optical axis $AX_{20}$. The projection lens 21 can be configured to be a plano-convex aspheric projection lens having a convex front surface (on the front side of the vehicle body) and a plane rear surface (on the rear side of the vehicle body).

The light source 22 can include, for example, four white LEDs with the configuration of a blue LED element B, a red LED element R, and a green phosphor G in combination, and the white LED can have a light emission surface by 1 mm square, for example. The green phosphor G can cover the blue and red LED elements B and R so as to be excited by the blue light from the blue LED element B to emit green light. If such green light is increased to change the emission color to bluish green, the emission color of the light source may be deviated from the white area on the CIE chromaticity diagram as stipulated by the particular law. To cope with this, the output of the red LED element R can be adjusted to cause the emission color of the light source to satisfy the white area on the CIE chromaticity diagram as stipulated by the particular law. The combination of the blue LED element, the red LED element, and the green phosphor can be appropriately selected from known ones.

The light source 22 can have the S/P ratio of 2.0 by adjusting the green phosphor concentration, so that the emission light satisfies the white area on the CIE chromaticity diagram as stipulated by the particular law. Note that the S/P ratio of the light source 22 is not limited to 2.0. The S/P ratio of the light source 22 can take any value within the range of 2.0 to 3.0 on the basis of the following findings. Specifically, this is because the earlier awareness with peripheral vision under dark environment (e.g., during nighttime driving) can be achieved by illuminating the peripheral areas in front of the vehicle body with light emitted from a light source with the S/P ratio of 2.0 or more (meaning, thereby the reaction speed RT can be shortened and the missing-out rate can be lowered on the basis of the findings of Experiments 1 and 2). Further, a reason why the light source 22 with the S/P ratio of up to 3.0 is utilized can be described as follows. That is, when the S/P ratio exceeds 3.0, it is difficult for the emission light from the light source to satisfy the white range on the CIE chromaticity diagram as stipulated by the particular law.

Based on the correlation between the S/P ratio and the missing-out rate, it was found that the difference of awareness depending on the age disappears when the S/P ratio is 2.5 or more (see Experiment 1). Based on these findings, when the light emitted from the light source having the S/P ratio being 2.5 or being 2.5 to 3.0 is projected to the peripheral area, it is possible to configure a vehicle headlight in which the difference of awareness depending on the age under dark environment (e.g., during nighttime driving) does not occur.

The light source 22 may be a light source the emission light of which satisfies the white area on the CIE chromaticity diagram as stipulated by the particular law and which has the S/P ratio of 2.0 or more. Therefore, the configuration of the white LED is not limited to the combination of the blue and red LED elements with the green phosphor.

Figure 9B:
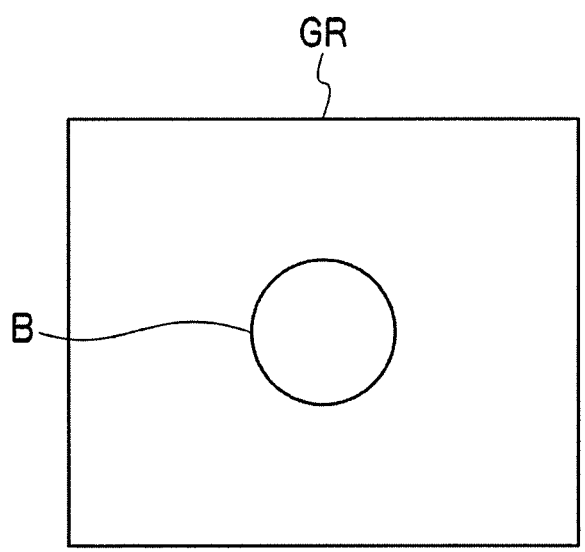

For example, the light source 22 can be a white LED as shown in FIG. 9B, in which a blue LED element B is combined with a green and red phosphor GR. The green and red phosphor GR can cover the blue LED element B and can be excited by the blue light emitted from the blue LED element B to emit green light and red light. Further, the light source 22 can be a white LED configured to combine a red LED element, a green LED element and a blue LED element, a white LED configured to combine a ultraviolet LED element or a new-ultraviolet LED element with a RGB phosphor, or the like. Even with these white LEDs, the concentration of the phosphor can be adjusted to satisfy the emission color within the white area on the CIE chromaticity diagram as stipulated by the particular law as well as to provide the S/P ratio of 2.0 or more.

The light source 22 (including the four white LED, for example) can be mounted on a substrate K while the light emission surface thereof faces upward so that the light source 22 is disposed behind the rear focal point $F_{21}$ of the projection lens 21 and on or near the optical axis $AX_{20}$. Further, the white LEDs 22 can be arranged such that a plurality of (four in the present exemplary embodiment) LEDs are arranged in line at predetermined intervals and symmetric with respect to the optical axis $AX_{20}$ while one of the sides is to extend along a horizontal line perpendicular to the optical axis $AX_{20}$ (in the direction perpendicular to the paper plane of FIG. 29B).

The reflector 23 can be an ellipsoid of revolution or a free curved surface equivalent to an ellipsoid, having a first focal point F1 at or near the light source 22 and a second focal point F2 at or near (i.e., substantially at) the rear focal point $F_{21}$ of the projection lens 21.

The reflector 23 can be configured to extend from the deeper side of the light source 22 (the side of the light source 22 on the rear side of the vehicle body as shown in FIG. 29B) to the projection lens 21 while covering above the light source 22. The thus configured reflector 23 can receive the light emitted substantially upward from the light source 22.

Figure 30B:
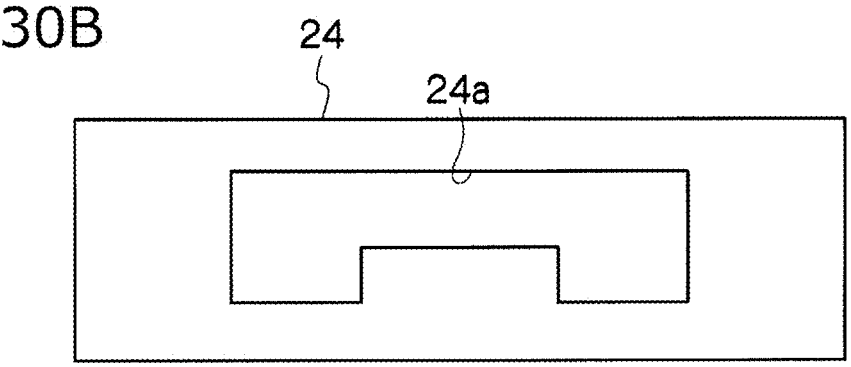

FIG. 30B is a front view of the shade 24. As shown in the drawing, the shade 24 can have an opening 24a with a shape corresponding to the peripheral areas A2 and the near side area A4. Specifically, the rear focal point $F_{21}$ of the projection lens 21 can be located at or near the opening 24a.

According to the lighting unit 20 with the above configuration, the light emitted from the light source 22 can be impinge on the reflector 23 and reflected by the same to converge at the rear focal point $F_{21}$ of the projection lens 21, then can pass through the opening 24a of the shade 24 and further through the projection lens 21 to be projected forward. Specifically, the illuminance distribution formed by the light emitted from the light source 22 and passing through the opening 24a of the shade 24 can be reversed and projected forward by the action of the projection lens 21. In this manner, the peripheral areas A2 and the near side area A4 on the virtual vertical screen (assumed to be disposed in front of the vehicle body and approximately 25 meters away from the body) can be illuminated with this light.

Note that, as described above, the lighting unit 20 can also be adjusted in terms of its optical axis by a known aiming mechanism (not shown) to illuminate the peripheral areas A2 and the near side area A4.

[Lighting Unit 30]

The lighting unit 30 can be a projector-type lighting unit configured to illuminate the intermediate areas A3 with light. The lighting unit 30, as shown in FIG. 29C, can have an optical axis $AX_{30}$ extending in the vehicle front-to-rear direction and can include a projection lens 31 disposed on the optical axis $AX_{30}$ and having a rear focal point $F_{31}$, a light source 32 disposed behind the rear focal point $F_{31}$ of the projection lens 31 and on or near (i.e., substantially on) the optical axis $AX_{30}$, a reflector 33 disposed above the light source 32, a shade 34 disposed between the projection lens 31 and the light source 32 so as to shield part of light from the light source 31, and the like.

The projection lens 31 can be held by a not-shown lens holder or the like so as to be disposed on the optical axis $AX_{30}$. The projection lens 31 can be configured to be a plano-convex aspheric projection lens having a convex front surface (on the front side of the vehicle body) and a plane rear surface (on the rear side of the vehicle body).

The light source 32 can include, for example, four white LEDs with the configuration of a blue LED element and a yellow phosphor in combination, and the white LED can have a light emission surface by 1 mm square, for example. The combination of the blue LED element and the yellow phosphor can be appropriately selected from known ones.

The light source 32 can have the S/P ratio of 1.8 by adjusting the yellow phosphor concentration, so that the emission light satisfies the white area on the CIE chromaticity diagram as stipulated by the particular law. Note that the S/P ratio of the light source 32 is not limited to 1.8. Based on the findings in which the light source with high S/P ratio, in particular, of 1.8 or more can cause persons to become aware of object colored white, blue, and green clearly (see Experiment 3), the light source 32 can be a light source with the S/P ratio of 1.8 to 3.0. Further, the reason why the light source 32 with the S/P ratio of up to 3.0 is utilized can be described as follows. That is, when the S/P ratio exceeds 3.0, it is difficult for the emission light from the light source to satisfy the white range on the CIE chromaticity diagram as stipulated by particular laws or rules.

The light source 32 may be a light source the emission light of which satisfies the white area on the CIE chromaticity diagram as stipulated by the particular law and which has the S/P ratio of 1.8 or more. Therefore, the configuration of the white LED is not limited to the combination of the blue LED element with the yellow phosphor, and may be any white LED with other configurations as long as the above conditions are satisfied.

The light source 32 (including the four white LED, for example) can be mounted on a substrate K while the light emission surface thereof faces upward so that the light source 32 is disposed behind the rear focal point $F_{31}$ of the projection lens 31 and on or near the optical axis $AX_{30}$. Further, the white LEDs 32 can be arranged such that a plurality of (four in the present exemplary embodiment) LEDs are arranged in line at predetermined intervals and symmetric with respect to the optical axis $AX_{30}$ while one of the sides is to extend along a horizontal line perpendicular to the optical axis $AX_{30}$ (in the direction perpendicular to the paper plane of FIG. 29C).

The reflector 33 can be an ellipsoid of revolution or a free curved surface equivalent to an ellipsoid, having a first focal point F1 at or near the light source 32 and a second focal point F2 at or near (i.e., substantially at) the rear focal point $F_{31}$ of the projection lens 31.

The reflector 33 can be configured to extend from the deeper side of the light source 32 (the side of the light source 32 on the rear side of the vehicle body as shown in FIG. 29C) to the projection lens 31 while covering above the light source 32. The thus configured reflector 33 can receive the light emitted substantially upward from the light source 32.

Figure 30C:
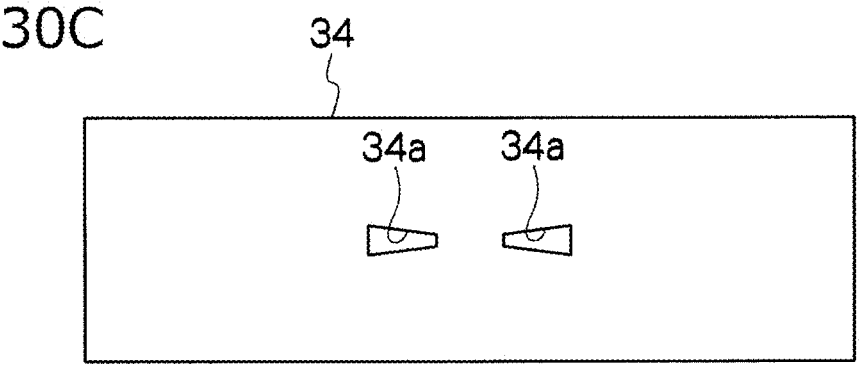

FIG. 30C is a front view of the shade 34. As shown in the drawing, the shade 34 can have openings 34a with a shape corresponding to the intermediate areas A3. Specifically, the rear focal point $F_{31}$ of the projection lens 31 can be located at or near the intermediate between the right and left openings 34a (substantially at the center between them).

According to the lighting unit 30 with the above configuration, the light emitted from the light source 32 can be impinge on the reflector 33 and reflected by the same to converge at the rear focal point $F_{31}$ of the projection lens 31, then can pass through the openings 34a of the shade 34 and further through the projection lens 31 to be projected forward. Specifically, the illuminance distribution formed by the light emitted from the light source 32 and passing through the openings 34a of the shade 34 can be reversed and projected forward by the action of the projection lens 31. In this manner, the intermediate areas A3 on the virtual vertical screen can be illuminated with this light.

Note that, as described above, the lighting unit 30 can be adjusted in terms of its optical axis by a known aiming mechanism (not shown) to illuminate the intermediate areas A3.

As described above, in the vehicle headlight 100 with the above configuration, the light source 22 can be a light source having the S/P ratio of 2.0 or more, and can illuminate the peripheral areas A2 (A2R, A2L) with light. This can facilitate the earlier awareness of an object with peripheral vision under dark condition (e.g., during nighttime driving).

Furthermore, the light emitted from the light source 12 having the S/P ratio (of 1.5 or more) lower than the S/P ratio (of 2.0 or more) of the light source 22 with which the peripheral areas A2 are illuminated can be utilized to illuminate the central area A1. When compared with the case where the light emitted from a light source with the same S/P ratio as that of the light source 22, namely, the S/P ratio of 2.0 or more, is projected to the central area A1, this configuration can suppress or prevent the generation of glare light to an opposite vehicle.

Further, according to the vehicle headlight 100 with the above configuration, the light emitted from the light source 22 with the S/P ratio (of 2.0 or more) larger than the S/P ratio (of 1.5 or more) of the light source 12 can be projected to the peripheral areas A2 (A2R and A2L). When compared with the case where the light emitted from a light source with the same S/P ratio as that of the light source 12, namely, the S/P ratio of 1.5 or more, is projected to the peripheral areas A2 (A2R and A2L), this configuration can facilitate the earlier awareness with peripheral vision under dark condition (e.g., during nighttime driving).

As discussed above, the vehicle headlight 100 with the above configuration can suppress or prevent the generation of glare light to an opposite vehicle as well as can facilitate the earlier awareness with peripheral vision under dark condition (e.g., during nighttime driving).

In addition, the vehicle headlight 100 with the above configuration can illuminate the intermediate area A3 through which signs relatively move and pass during traveling with light emitted from the light source 33 with the S/P ratio (of 1.8 or more) which is different from those of the light sources 12 and 22.

Therefore, when the light emitted from the light source 33 with the S/P ratio of 1.8 or more is projected to the intermediate area A3 where signs relatively move and pass during driving, a driver can observe the signs (including, particularly, white, blue and green colored signs) clearly even under dark environment (e.g., during nighttime driving).

Furthermore, the vehicle headlight 100 with the above configuration can enhance the sense of brightness at the near side area in front of the vehicle body (the closer area in front of the vehicle body on the own lane) under dark environment (e.g., during nighttime driving) without increasing the illuminance. This can be achieved by the light emitted from the light source 22 with the S/P ratio of 2.0 or more and projected to the near side area A4 in front of the vehicle body.

Next, modifications will be described.

In the above exemplary embodiment, a description has been given of the case where the light distribution pattern in which the earlier awareness with peripheral vision is facilitated can include the central area A1, the peripheral areas A2, the intermediate areas A3, and the near side area A3 as shown in FIG. 22, but the presently disclosed subject matter is not limited thereto. For example, the light distribution pattern in which the earlier awareness with peripheral vision is facilitated can include at least the peripheral areas A2, and the other areas including the areas A1, A3, and A4 may not be included or some of them (for example, A1 and A4) may be included without the lighting unit 30. In this case, for example, the opening 24a of the shade 24 can be enlarged to project light from the light source 22 to cover the missing area (for example, A3).

Further, in the above exemplary embodiment the optical systems for projecting light beams from the respective light sources 12, 22, and 32 with different S/P ratios to the respective areas A1 to A4 are configured by the projector type optical systems, but the presently disclosed subject matter is not limited thereto.

Examples of the optical systems for projecting light beams from the respective light sources 12, 22, and 32 with different S/P ratios to the respective areas A1 to A4 may include a reflector type optical system, and a direct projection type optical system.

Figure 31A:
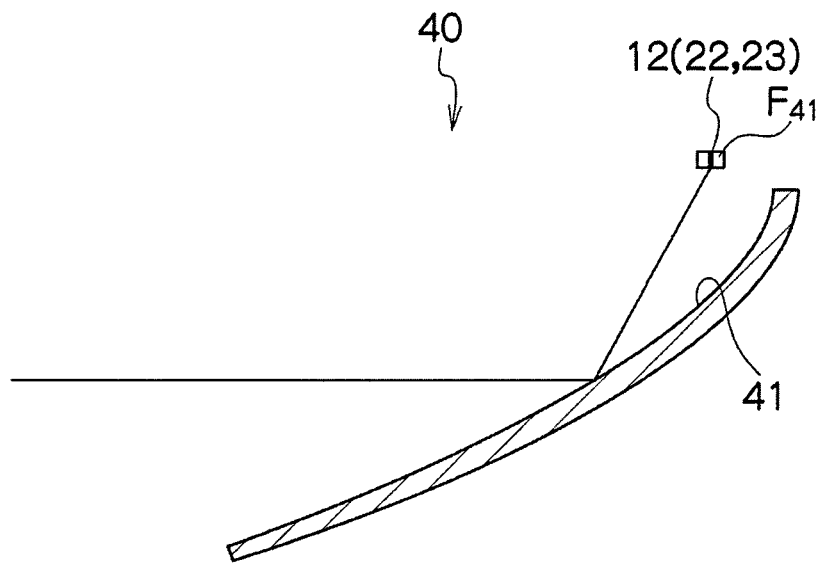
FIGS. 31A and 31B are a cross-sectional view of a reflector type lighting unit, and a cross-sectional view of a direct projection type lighting unit, respectively.

FIG. 31A is a cross-sectional view of a reflector type lighting unit 40. As shown in the drawing, the reflector type lighting unit 40 can include a paraboloid reflector 41 including a plurality of small reflection sections or a free curved surface equivalent to the paraboloid and having a focal point $F_{41}$, and a light source 12 disposed at or near the focal point $F_{41}$ of the reflector 41.

In the above reflector type lighting unit 40, the reflector 41 can be designed such that the light emitted from the light source 12 with the S/P ratio of 1.5 or more, for example, can impinge on the reflector surface and be reflected to predetermined directions (distributed) so as to illuminate the central region A1 (namely, the respective small reflection sections are designed). Therefore, the lighting unit 40 can illuminate the central area A1 in front of the vehicle body.

In the same manner, there can be provided a reflector type lighting unit having a light source 22 with the S/P ratio of 2.0 or more for illuminating the peripheral areas A2 and the near side area A4 with light from the light source 22, and a reflector type lighting unit having a light source 32 with the S/P ratio of 1.8 or more for illuminating the intermediate areas A3 with light from the light source 32.

Figure 31B:
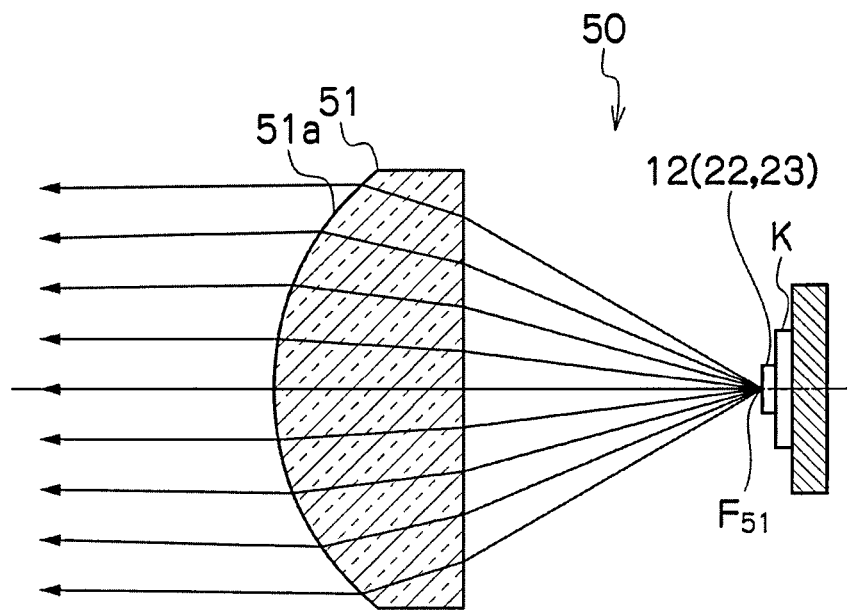

FIG. 31B is a cross-sectional view of a direct projection type lighting unit 50. As shown in the drawing, the direct projection type lighting unit 50 can include a projection lens 51 having a rear focal point $F_{51}$, and a light source disposed at or near the rear focal point $F_{51}$ of the projection lens 51.

In the above direct projection type lighting unit 50, the projection lens 51 can have a light emission surface 51a that is designed such that the light emitted from the light source 12 with the S/P ratio of 1.5 or more, for example, can be refracted by the projection lens 51 to predetermined directions so as to illuminate the central region A1. Therefore, the lighting unit 50 can illuminate the central area A1 in front of the vehicle body.

In the same manner, there can be provided a direct projection type lighting unit having a light source 22 with the S/P ratio of 2.0 or more for illuminating the peripheral areas A2 and the near side area A4 with light from the light source 22, and a direct projection type lighting unit having a light source 32 with the S/P ratio of 1.8 or more for illuminating the intermediate areas A3 with light from the light source 32.

Figure 32:
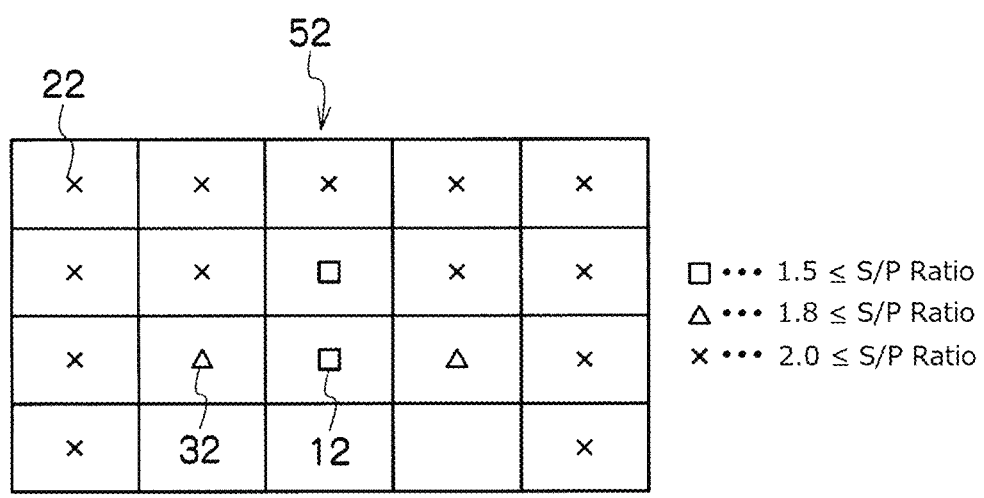
FIG. 32 is a diagram illustrating an exemplary light source 52 including a plurality of white LEDs with different S/P ratios, showing the arrangement thereof.

FIG. 32 is a diagram illustrating an exemplary light source 52 including a plurality of white LEDs with different S/P ratios in a matrix arrangement. Specifically, in the direct projection type lighting unit 50, the light source 52 can be substituted for the light source 12 as shown in FIG. 31B.

In FIG. 32, the square represents a light source with the S/P ratio of 1.5 or more (equivalent to the light source 12), the triangle represents a light source with the S/P ratio of 1.8 or more (equivalent to the light source 32), and the cross represents a light source with the S/P ratio of 2.0 or more (equivalent to the light source 22). Furthermore, the respective light sources can be arranged at places corresponding to the respective areas A1 to A4 as shown in FIG. 22.

In this modification, the light beams emitted from the light source 52 including a plurality of LEDs (or the light sources 12, 22, and 32) can be projected via the projection lens 51 while reversed by the action of the projection lens 51. With this configuration, the respective areas A1 to A4 on the virtual vertical screen can be illuminated therewith.

With this configuration, the same or equivalent advantageous effects as in the above exemplary embodiments can be exhibited.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light comprising:
a light source; and
an optical system configured to direct light emitted from the light source to at least a peripheral area of an illumination area in front of a vehicle body, wherein
an S/P ratio of the light source is represented by $(S(\lambda)*V'(\lambda))/(S(\lambda)*V(\lambda))$ in which $S(\lambda)$ is a spectrum of the light source, $V'(\lambda)$ is a relative luminosity factor in scotopic vision, and $V(\lambda)$ is a relative luminosity factor in photopic vision, and wherein the S/P ratio is 2.0 or more.

2. The vehicle light according to claim 1, further comprising:
a primary light source;
a primary optical system configured to direct light emitted from the primary light source to a central area of the illumination area in front of the vehicle body, wherein
an S/P ratio of the primary light source is represented by $(S(\lambda)*V'(\lambda))/(S(\lambda)*V(\lambda))$ in which $S(\lambda)$ is a spectrum of the primary light source, $V'(\lambda)$ is a relative luminosity factor in scotopic vision, and $V(\lambda)$ is a relative luminosity factor in photopic vision, and wherein the S/P ratio of the primary light source is less than the S/P ratio of the light source.

3. A vehicle light, configured to form a prescribed light distribution pattern on a virtual vertical screen in front of a vehicle body, with the light distribution pattern including a central area of an illumination area including an intersection between a horizontal center line and a vertical center line on the virtual vertical screen and peripheral areas located on either side of the central area, the vehicle light comprising:
a first light source;
a second light source;
a first optical system configured to direct light emitted from the first light source to the central area of the light distribution pattern; and
a second optical system configured to direct light emitted from the second light source to the peripheral areas, wherein
the first light source has an S/P ratio, which is represented by $(S(\lambda)*V'(\lambda))/(S(\lambda)*V(\lambda))$ in which $S(\lambda)$ is a spectrum of the first light source, $V'(\lambda)$ is a relative luminosity factor in scotopic vision, and $V(\lambda)$ is a relative luminosity factor in photopic vision, lower than an S/P ratio of the second light source.

4. The vehicle light according to claim 3, wherein the S/P ratio of the second light source is set to 2.0 or more.

5. The vehicle light according to claim 4, wherein the S/P ratio of the first light source is set to 1.5 or more.

6. The vehicle light according to claim 5, further comprising a third light source and a third optical system therefor, and wherein
the prescribed light distribution pattern further includes an intermediate area between the central and peripheral areas on the virtual vertical screen, through which signs relatively move and pass during traveling of the vehicle, and
the third optical system is configured to project light emitted from the third light source to the intermediate area of the illumination area.

7. The vehicle light according to claim 6, wherein the third light source has an S/P ratio of 1.8 or more.

8. The vehicle light according to claim 7, wherein
the prescribed light distribution pattern further includes a near side area disposed below the horizontal center line on the virtual vertical screen, and
the second optical system is configured to project light emitted from the second light source to the near side area in addition to the peripheral areas.

9. The vehicle light according to claim 6, wherein
the prescribed light distribution pattern further includes a near side area disposed below the horizontal center line on the virtual vertical screen, and
the second optical system is configured to project light emitted from the second light source to the near side area in addition to the peripheral areas.

10. The vehicle light according to claim 5, wherein
the prescribed light distribution pattern further includes a near side area disposed below the horizontal center line on the virtual vertical screen, and
the second optical system is configured to project light emitted from the second light source to the near side area in addition to the peripheral areas.

11. The vehicle light according to claim 4, further comprising a third light source and a third optical system therefor, and wherein
the prescribed light distribution pattern further includes an intermediate area between the central and peripheral areas on the virtual vertical screen, through which signs relatively move and pass during traveling of the vehicle, and
the third optical system is configured to project light emitted from the third light source to the intermediate area of the illumination area.

12. The vehicle light according to claim 11, wherein the third light source has an S/P ratio of 1.8 or more.

13. The vehicle light according to claim 12, wherein
the prescribed light distribution pattern further include a near side area disposed below the horizontal center line on the virtual vertical screen, and
the second optical system is configured to project light emitted from the second light source to the near side area in addition to the peripheral areas.

14. The vehicle light according to claim 11, wherein
the prescribed light distribution pattern further includes a near side area disposed below the horizontal center line on the virtual vertical screen, and
the second optical system is configured to project light emitted from the second light source to the near side area in addition to the peripheral areas.

15. The vehicle light according to claim 4, wherein
the prescribed light distribution pattern further includes a near side area disposed below the horizontal center line on the virtual vertical screen, and
the second optical system is configured to project light emitted from the second light source to the near side area in addition to the peripheral areas.

16. The vehicle light according to claim 3, further comprising a third light source and a third optical system therefor, and wherein
the prescribed light distribution pattern further includes an intermediate area between the central and peripheral areas on the virtual vertical screen, through which signs relatively move and pass during traveling of the vehicle, and
the third optical system is configured to project light emitted from the third light source to the intermediate area of the illumination area.

17. The vehicle light according to claim 16, wherein the third light source has an S/P ratio of 1.8 or more.

18. The vehicle light according to claim 17, wherein
the prescribed light distribution pattern further includes a near side area disposed below the horizontal center line on the virtual vertical screen, and
the second optical system is configured to project light emitted from the second light source to the near side area in addition to the peripheral areas.

19. The vehicle light according to claim 16, wherein
the prescribed light distribution pattern further includes a near side area disposed below the horizontal center line on the virtual vertical screen, and
the second optical system is configured to project light emitted from the second light source to the near side area in addition to the peripheral areas.

20. The vehicle light according to claim 3, wherein
the prescribed light distribution pattern further includes a near side area disposed below the horizontal center line on the virtual vertical screen, and
the second optical system is configured to project light emitted from the second light source to the near side area in addition to the peripheral areas.

* * * * *